United States Patent
Jacobs et al.

(10) Patent No.: US 9,100,549 B2
(45) Date of Patent: Aug. 4, 2015

(54) METHODS AND APPARATUS FOR REFERRING MEDIA CONTENT

(75) Inventors: Paul E. Jacobs, La Jolla, CA (US); Ravinder Paul Chandhok, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1207 days.

(21) Appl. No.: 12/119,418

(22) Filed: May 12, 2008

(65) Prior Publication Data

US 2009/0282111 A1    Nov. 12, 2009

(51) Int. Cl.

| | |
|---|---|
| G06F 15/16 | (2006.01) |
| H04M 11/10 | (2006.01) |
| G06Q 30/00 | (2012.01) |
| H04N 7/173 | (2011.01) |
| H04N 21/2547 | (2011.01) |
| H04N 21/262 | (2011.01) |
| H04N 21/442 | (2011.01) |
| H04N 21/4788 | (2011.01) |
| H04N 21/6408 | (2011.01) |
| H04N 21/658 | (2011.01) |

(Continued)

(52) U.S. Cl.
CPC ....... *H04N 7/17318* (2013.01); *H04N 21/2547* (2013.01); *H04N 21/262* (2013.01); *H04N 21/44213* (2013.01); *H04N 21/4788* (2013.01); *H04N 21/6408* (2013.01); *H04N 21/6582* (2013.01); *H04N 21/812* (2013.01); *G06F 17/3002* (2013.01); *H04H 20/57* (2013.01); *H04H 60/37* (2013.01)

(58) Field of Classification Search
CPC ............. H04N 21/47214; H04H 60/37; G06F 17/3002
USPC ........ 370/312; 455/414.1; 709/231, 233, 219; 725/46

See application file for complete search history.

(56) References Cited

U.S. PATENT DOCUMENTS 5,377,322 A * 12/1994 Ogura et al. .................... 714/57
6,810,423 B1 * 10/2004 Gonno et al. ................. 709/229

(Continued)

FOREIGN PATENT DOCUMENTS

| CN | 1531698 A | 9/2004 |
|---|---|---|
| WO | 0191474 | 11/2001 |
| WO | 02057971 | 7/2002 |

OTHER PUBLICATIONS

International Search Report, PCT/US2009/043243, International Searching Authority, European Patent Office, Aug. 27, 2009.

(Continued)

*Primary Examiner* — Krista Zele
*Assistant Examiner* — Margishi Desai
(74) *Attorney, Agent, or Firm* — The Marbury Law Group, PLLC

(57) ABSTRACT

Methods, devices, computer program products and systems are provided for referring media content at communication devices, such as wireless communication devices. The methods, systems and devices allow for all forms of media content to be referred, such as audio, video, multimedia content and the like and, in particular advertising content. In addition, the methods, systems and devices provide for the content providers to optimize the delivery schedules and/or methods of delivery based on the volume of referrals. In addition, by tracking the volume of referrals, content providers can alter billing structure, such as advertising rates associated with advertising content.

89 Claims, 8 Drawing Sheets

(51) Int. Cl.
*H04N 21/81* (2011.01)
*G06F 17/30* (2006.01)
*H04H 60/37* (2008.01)
*H04H 20/57* (2008.01)

(56) References Cited

U.S. PATENT DOCUMENTS

| | | | |
|---|---|---|---|
| 6,820,116 B1* | 11/2004 | Pyhalammi et al. | 709/219 |
| 6,834,195 B2* | 12/2004 | Brandenberg et al. | 455/456.3 |
| 6,845,396 B1* | 1/2005 | Kanojia et al. | 709/224 |
| 6,907,406 B2* | 6/2005 | Suzuki | 705/52 |
| 6,965,580 B1* | 11/2005 | Takagi et al. | 370/312 |
| 6,985,746 B2* | 1/2006 | Gorsuch | 455/456.3 |
| 7,092,999 B2* | 8/2006 | Levitan | 709/218 |
| 7,222,185 B1* | 5/2007 | Day | 709/232 |
| 7,330,824 B1* | 2/2008 | Kanojia et al. | 705/14.61 |
| 7,685,259 B2* | 3/2010 | Strand | 709/219 |
| 2001/0025377 A1* | 9/2001 | Hinderks | 725/109 |
| 2002/0107808 A1* | 8/2002 | Dobbelaar | 705/52 |
| 2003/0229681 A1* | 12/2003 | Levitan | 709/218 |
| 2004/0181819 A1* | 9/2004 | Theiste et al. | 725/146 |
| 2004/0266441 A1* | 12/2004 | Sinha et al. | 455/445 |
| 2005/0076210 A1* | 4/2005 | Thomas et al. | 713/165 |
| 2005/0114430 A1* | 5/2005 | Zheng et al. | 709/200 |
| 2005/0144165 A1* | 6/2005 | Hafizullah et al. | 707/6 |
| 2006/0161950 A1* | 7/2006 | Imai et al. | 725/46 |
| 2006/0294021 A1* | 12/2006 | Masuda | 705/64 |
| 2007/0021056 A1* | 1/2007 | Arseneau et al. | 455/3.06 |
| 2007/0121651 A1* | 5/2007 | Casey et al. | 370/401 |
| 2007/0207780 A1* | 9/2007 | McLean | 455/414.1 |
| 2008/0062912 A1* | 3/2008 | Tiedemann et al. | 370/318 |
| 2008/0183719 A1* | 7/2008 | Kageyama et al. | 707/10 |
| 2008/0313268 A1* | 12/2008 | Batalden et al. | 709/203 |
| 2008/0320516 A1* | 12/2008 | Yee et al. | 725/44 |
| 2009/0089447 A1* | 4/2009 | Balachandran et al. | 709/231 |
| 2009/0100332 A1* | 4/2009 | Kanjilal et al. | 715/235 |
| 2009/0164781 A1* | 6/2009 | Bouchard | 713/165 |
| 2009/0210901 A1* | 8/2009 | Hawkins et al. | 725/34 |
| 2010/0031162 A1* | 2/2010 | Wiser et al. | 715/747 |
| 2010/0036966 A1* | 2/2010 | Munetsugu et al. | 709/231 |
| 2010/0131992 A1* | 5/2010 | Kenmotsu et al. | 725/90 |
| 2012/0278451 A1* | 11/2012 | Han | 709/219 |

OTHER PUBLICATIONS

Written Opinion, PCT/US2009/043243, International Searching Authority, European Patent Office, Aug. 27, 2009.
International Preliminary Report on Patentability, PCT/US2009/043243, International Preliminary Examining Authority, European Patent Office, May 6, 2010.
Korean Notice of Grounds for Rejection; Korean Patent Application No. 2010-7027907; Nov. 30, 2012.

* cited by examiner

METHODS AND APPARATUS FOR REFERRING MEDIA CONTENT

BACKGROUND

The disclosed aspects relate to communication devices, and more particularly, to systems and methods for referring media content at a communication device.

Communication devices, and more specifically wireless communication devices, such as cellular telephones, have rapidly gained in popularity over the past decade. These devices are rapidly becoming multifaceted devices capable of providing a wide-range of functions. For example, a cellular telephone may also embody computing capabilities, Internet access, electronic mail, text messaging, GPS mapping, digital photographic capability, an audio/MP3 player, video gaming capabilities and the like.

In addition, wireless communication devices are increasingly being manufactured with the ability to receive media content, such as audio content, video content, multimedia content or the like. As such, the communication devices may be configured to receive one-to-many transmissions, such as broadcast transmissions and/or multicast transmissions and/or one-to-one transmissions, such as unicast transmissions or the like. An example of a current multicast system is the MediaFLO™ system available from Qualcomm Incorporated of San Diego, Calif. The MediaFLO™ system utilizes orthogonal frequency division multiplexing (OFDM)-air interface based technology designed specifically for multicasting a significant volume of rich multimedia content cost effectively to wireless device subscribers.

While multicasting and other transmission media allow for wireless devices to reliably receive multimedia content in a mobile environment, users of such media content also enjoy being able to refer or otherwise recommend media content to friends, colleagues, family and the like. For example, a user may choose to refer or recommend audio content, such as a song or compact disc or video content, such as a broadcast program, a gaming application, or the like.

In addition to conventional audio or video content, many multicast and/or broadcast systems rely on advertisements for generating revenue. In many instances advertisements themselves have become a form of media content, in that, in addition to providing information regarding a product or service, the advertisement may be artistically significant, humorous, thought-provoking, or otherwise entertaining. As such, a user may desire to refer or otherwise recommend advertisements to friends, colleagues, family or the like.

Further, media content providers are always concerned with optimizing the transmission and reception of media content. In a multicast system content is delivered over a finite number of broadcast channels. Typically any one content item, such as a program, song, advertisement or the like is broadcasted on a scheduled basis. In order to optimize the transmission and reception of media content it is necessary to know what content the users are using, viewing or otherwise consuming. In this regard, once the media content providers are aware of which content is being consumed by the users, the content providers can adjust delivery schedules or otherwise re-allocate network resources to insure that the highly consumed content is delivered more frequently. While actual use/consumption information provides data for optimizing delivery schedules, often times, in the fleeting world of media content, the use/consumption information is considered "dated" material and optimization of delivery schedules based on this data may be out-dated.

Therefore a need exists to develop methods and apparatus for referring media content at communication devices, such as wireless communication devices.

SUMMARY

The disclosed apparatus and methods provide for the referral of media content, such as broadcast, multicast and/or unicast media content between communication devices, such as wireless communication devices.

In particular, devices, methods, apparatus, computer-readable media and processors are presented that provide for referring media content at communication devices, such as wireless communication devices. The methods, systems and devices provide for the referral of broadcast, multicast, and/or unicast transmitted media content. The methods, systems and devices should allow for all forms of media content to be referred, such as audio, video, multimedia content and the like and, in particular advertising content. In addition, the methods, systems and devices provide for the content providers to optimize the delivery schedules and/or methods of delivery based on the volume of referrals.

In addition to knowing what content users are viewing/consuming as a means of optimizing delivery of media content, the media content providers also benefit from knowing which media content users are referring or otherwise recommending to other users. Typically, referrals and recommendations occur as a means of getting the word out that the particular media content is available and is appealing. Thus, referrals or recommendation information may allow content providers the ability to predict, early on in the life of the media content, the popularity of a media content item and to adjust the delivery schedules accordingly. In this regard, media content that is being more frequently referred may be broadcasted more frequently and media content that is less frequently being referred may be broadcasted less frequently.

For the specific aspect that involves referral of advertising content, if the media content provider is aware of what advertisements are being referred, the content providers can not only adjust delivery schedules but also charge the advertising entity at a different rate based on the popularity of the advertisement and/or the increased network allocation for the advertisement.

According to one aspect, a method for referring content is defined. The referred content may include media content including, but not limited to, audio content, video content, multimedia content and the like. In particular aspects the referred content may be advertising content. The method includes the steps of obtaining, via a one-to-many transmission received by a first communication device, a plurality of content, wherein each of the plurality of content includes a corresponding content identifier. A one-to-many transmission may include a broadcast transmission, a multicast transmission or the like. The method also includes obtaining, at the first communication device, the content identifier corresponding to a predetermined one of the plurality of content desired to be referred, obtaining, at the first communication device, a referral identifier corresponding to a predetermined referral-receiving device and referring the predetermined one of the plurality of content to the predetermined referral-receiving device by transmitting a first referral message including the content identifier and the referral identifier.

In certain aspects, the step of transmitting the first referral message may involve transmitting the first referral message to a network device that is operable to generate and transmit to the referral-receiving device, based on the referral identifier, a second referral message including the content identifier. In alternate aspects, the step of transmitting the first referral message may involve transmitting the first referral message to the predetermined referral-receiving device based on the referral identifier. In such aspects, the first referral message may be operable, upon receipt by the predetermined referral-receiving device, to activate the referral receiving-device to listen for a one-to-many transmission of the referred content or the first referral message may further include a link operable for providing a unicast transmission of the referred content.

A related aspect is defined by at least one processor configured to perform the actions of obtaining, via a one-to-many transmission received by a first communication device, a plurality of content wherein each of the plurality of content includes a corresponding content identifier, obtaining the content identifier corresponding to a predetermined one of the plurality of content desired to be referred, obtaining a referral identifier corresponding to a predetermined referral-receiving device and referring the predetermined one of the plurality of content to the predetermined referral-receiving device by transmitting a first referral message including the content identifier and the referral identifier.

Another related aspect is defined by a machine-readable medium comprising instructions stored thereon. The instructions include a first set of instructions for obtaining, via a one-to-many transmission, a plurality of content wherein each of the plurality of content includes a corresponding content identifier, a second set of instructions for obtaining the content identifier corresponding to a predetermined one of the plurality of content desired to be referred, a third set of instructions for obtaining a referral identifier corresponding to a predetermined referral-receiving device and a fourth set of instructions for referring the predetermined one of the plurality of content to the predetermined referral-receiving device by transmitting a first referral message including the content identifier and the referral identifier.

Yet another related aspect is defined by a communication device that includes means for obtaining, via a one-to-many transmission received by the communication device, a plurality of content, wherein each of the plurality of content comprises a corresponding content identifier, means for obtaining, at the communication device, the content identifier corresponding to a predetermined one of the plurality of content desired to be referred, means for obtaining, at the communication device, a referral identifier corresponding to a predetermined referral-receiving device and means for referring the predetermined one of the plurality of content to the predetermined referral-receiving device by transmitting a first referral message includes the content identifier and the referral identifier.

A further aspect is defined by a communication device that includes a computer platform including a processor and a memory. The communication device also includes a content receiver in communication with the processor and operable to receive one-to-many transmissions, such as broadcast, multicast or related transmissions, of a plurality of content and a content referral module stored in the memory and executable by the processor. The content referral module is operable to obtain a content identifier corresponding to a predetermined one of the plurality of content desired to be referred, obtain a referral identifier corresponding to a predetermined referral-receiving device and generate a referral request message that includes the content identifier and the referral identifier. The communication device also includes a communication module in communication with the processor and operable for transmitting the referral request message to at least one of a network device and the referral-receiving device.

Another aspect is provided for by a method for referring content, such as media content, that may include audio content, video content, multimedia content and the like. In one aspect, the content may be advertising content. The method includes receiving, at a network device, a referral request message from a communication device. The referral request message includes a first content identifier corresponding to a predetermined referred content and one or more referral identifiers each corresponding to a respective predetermined referral-receiving device. The method further includes transmitting a referral message to the one or more predetermined referral-receiving devices. The referral message includes a second content identifier corresponding to the predetermined referred content.

In some aspects, the method may also include optimizing future transmissions of the referred content based on the receipt of the referral request message. The optimization may entail adjusting a transmission schedule for the referred content based on a rate at which the content is being referred and/or determining a content delivery mechanism, such as multicast or unicast transmission, for the delivery of the referred content to the referral-receiving device. In other aspects, transmitting a referral message may entail multicasting the referral message to the one or more predetermined referral-receiving devices, or transmitting the referral message in conjunction with scheduled transmissions of the referred content.

A related aspect is defined by at least one processor operable at a network device and configured to perform the actions of receiving a referral request message from a communication device. The referral request message includes a first content identifier corresponding to a predetermined referred content and one or more referral identifiers each corresponding to a respective predetermined referral-receiving device, The processor is further configured to perform the action of transmitting a referral message to the one or more predetermined referral-receiving devices. The referral message includes a second content identifier corresponding to the predetermined referred content.

Another related aspect is provided for by a machine-readable medium including instructions stored thereon. The instructions include a first set of instructions for receiving, at a network device, a referral request message from a communication device. The referral request message includes a first content identifier corresponding to a predetermined referred content and one or more referral identifiers each corresponding to a respective predetermined referral-receiving device. The instructions also include a second set of instructions for transmitting a referral message to the one or more predetermined referral-receiving devices. The referral message includes a second content identifier corresponding to the predetermined referred content.

Yet another related aspect is defined by a network device that includes means for receiving a referral request message from a communication device. The referral request message includes a first content identifier corresponding to a predetermined referred content and one or more referral identifiers each corresponding to a respective predetermined referral-receiving device. The network device also includes means for transmitting a referral message to the one or more predetermined referral-receiving devices. The referral message comprises a second content identifier corresponding to the predetermined referred content.

A further related aspect is provided for by a network device that includes a computer platform including a processor and a memory. The device also includes a communication module in communication with the processor that is operable to receive a referral request message from a communication device. The referral request message includes a first content identifier corresponding to a predetermined referred content and one or more referral identifiers each corresponding to a respective predetermined referral-receiving device. The device also includes a referral coordinator module stored in the memory and executable by the processor. The referral coordinator module is operable to generate a referral message that is transmitted, by the communication module, to the one or more predetermined referral-receiving devices. The referral message includes a second content identifier corresponding to the predetermined referred content.

The network device may also include a referred content optimization module operable to optimize future transmissions of the referred content based on the receipt of the referral request message. The optimization module may further be operable to adjust a transmission schedule for the referred content based of a rate at which the content is being referred and/or determine a content delivery mechanism for the delivery of the referred content to the referral-receiving device.

Another aspect is defined by a method of obtaining content. The method includes receiving a referral message including a referred content identifier, receiving a one-to-many transmission of a plurality of content optimized, at least in part, based on the referral message. Each of the plurality of content corresponds to a respective content identifier. The method also includes obtaining the referred content from the transmission if a match exists between the referred content identifier and a respective content identifier of one of the plurality of content. In some aspects of the method receiving a referral message may entail receiving a one-to-many transmission that includes the referral message, receiving the referral message transmitted directly from a referring communication device and/or receiving the referral message transmitted from a network device.

A related aspect is defined by at least one processor configured to perform the actions of receiving a referral message including a referred content identifier and receiving a one-to-many transmission of a plurality of content optimized, at least in part, based on the referral message, Each of the plurality of content corresponds to a respective content identifier. The processor is also configured to perform the action of obtaining the referred content from the transmission if a match exists between the referred content identifier and a respective content identifier of one of the plurality of content.

Another related aspect is provided for by a machine-readable medium including instructions stored thereon. The instructions include a first set of instructions for receiving a referral message comprising a referred content identifier, a second set of instructions for receiving a one-to-many transmission of a plurality of content optimized, at least in part, based on the referral message. Each of the plurality of content corresponds to a respective content identifier. The instructions additionally include a third set of instructions for obtaining the referred content from the transmission if a match exists between the referred content identifier and a respective content identifier of one of the plurality of content.

A further related aspect is defined by a communication device including means for receiving a referral message comprising a referred content identifier, means for receiving a one-to-many transmission of a plurality of content optimized, at least in part, based on the referral message. Each of the plurality of content corresponds to a respective content identifier. The communication device also includes means for obtaining the referred content from the transmission if a match exists between the referred content identifier and a respective content identifier of one of the plurality of content.

Another aspect is defined by a communication device that includes a computer platform including a processor and a memory. The device also includes a communication module in communication with the processor that is operable to receive a referral message including a referred content identifier and operable to receive a one-to-many transmission of a plurality of content optimized, at least in part, based on the referral message, wherein each of the plurality of content corresponds to a respective content identifier. The device also includes a referral implementer module stored in the memory and executable by the processor. The referral implementer module is operable to obtain the referred content if a match exists between the referred content identifier and a respective content identifier of one of the plurality of content.

Thus, present aspects provide for referring media content at communication devices, such as wireless communication devices. The methods, systems and devices allow for all forms of media content to be referred, such as audio, video, multimedia content and the like and, in particular advertising content. In addition, the methods, systems and device provide for the content providers to optimize the delivery schedules and/or methods of delivery based on the volume of referrals. In addition, by tracking the volume of referrals, content providers can alter billing structure, such as advertising rates associated with advertising content.

BRIEF DESCRIPTION OF THE DRAWINGS

The disclosed aspects will hereinafter be described in conjunction with the appended drawings, provided to illustrate and not to limit the disclosed aspects, wherein like designations denote the elements, and in which.

DETAILED DESCRIPTION

The present devices, apparatus, methods, computer-readable media and processors now will be described more fully hereinafter with reference to the accompanying drawings, in which aspects of the invention are shown. The devices, apparatus, methods, computer-readable media and processors, however, may be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

The various aspects for content referral are described herein in connection with a wired or wireless communication device. A wired communication device may include a personal computer (PC), a network device, such as a server or any other device having computing and network communication capabilities. A wireless communication device can also be called a subscriber station, a subscriber unit, mobile station, mobile, remote station, access point, remote terminal, access terminal, user terminal, user agent, a user device, or user equipment. A wireless communication device may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

The described aspects provide for methods, apparatus and systems for referring media content at communication devices, such as wireless communication devices. The methods, systems and devices provide for the referral of broadcast, multicast, and/or unicast transmitted media content. The methods, systems and devices should allow for all forms of media content to be referred, such as audio, video, multimedia content and the like and, in particular advertising content. In addition, the methods, systems and device may provide for the content providers to optimize the delivery schedules and/or methods of delivery based on the volume of referrals.

Figure 1:
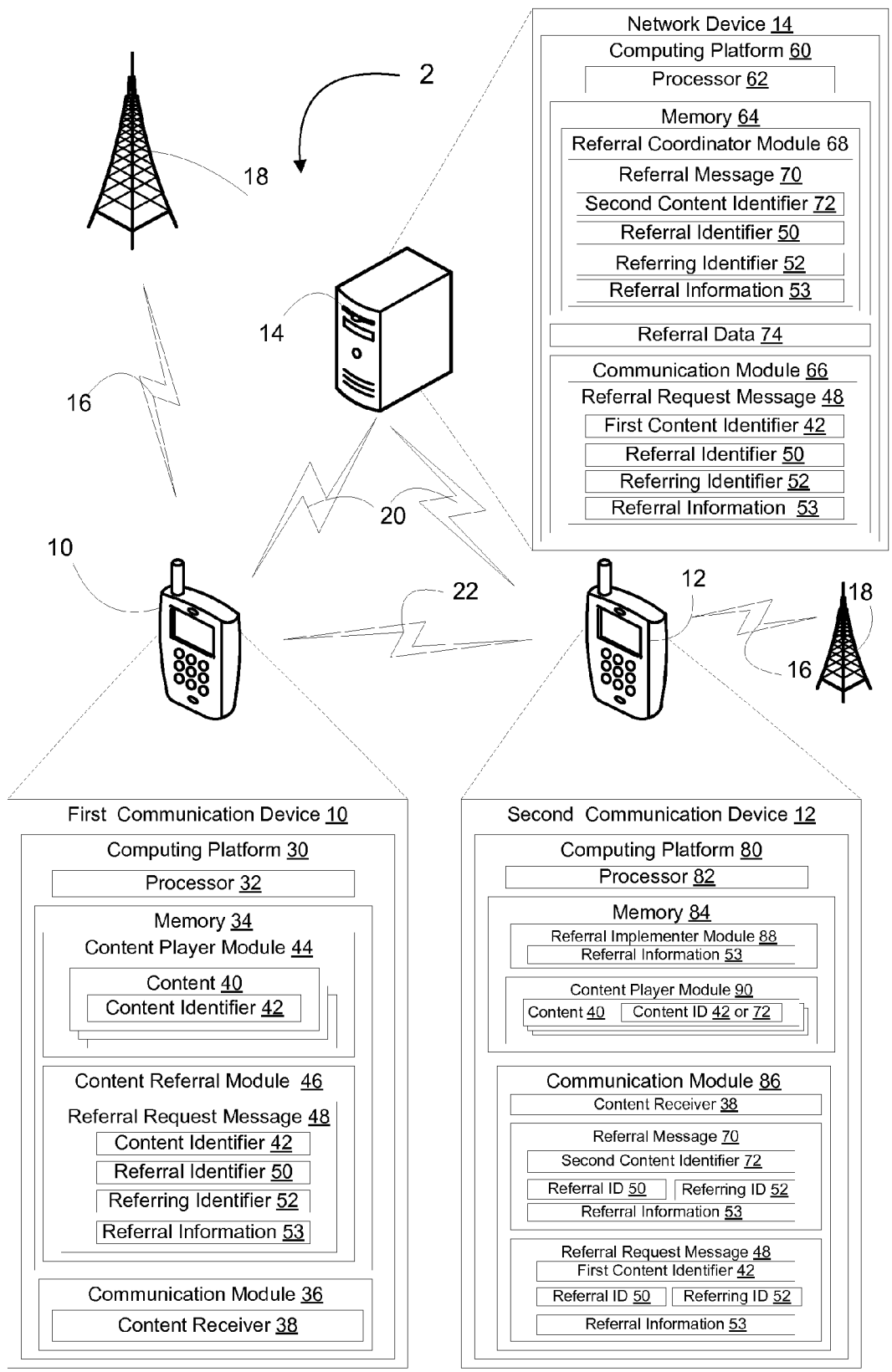
FIG. 1 is a schematic diagram of a system for referring content amongst communication devices, in accordance with an aspect.

Referring to FIG. 1, a schematic representation of a system 2 for referring content amongst communication devices. In the illustrated example of FIG. 1 the communication devices 10 and 12 are wireless communication devices. However, it should be noted that the aspects described herein are not limited to wireless communication devices and may include any form of communication device, wired or wireless. The referral system may include the first communication device 10, also referred to as the referring communication device, the second communication device 12, also referred to as the referral receiving device, and network device 14, which may serve to coordinate the referral and, in some aspects, optimize the delivery of content based on the received referrals.

The first and second communication devices 10 and 12 may be in broadcast communication 16 with broadcast network 18. Broadcast network 18 allows first and second communication devices 10 and 12 to receive one-to-many transmissions, such as broadcast or multicast transmission, of content, such as text content, audio content, video content, multimedia content and the like. The first and second communication devices 10 and 12 may also be in network communication 20, such as cellular network communication or the like, with network device 14. Additionally, the first and second wireless communication devices 10 and 12 may communication directly with each other via a peer-to-peer communication link 22 or any other direct communication link.

The first communication device 10 includes a computer platform 30 having a processor 32 and a memory 34. The first communication device 10 may also include a communication module 36 that includes a content receiver 38. The content receiver 38 is operable to allow first communication device 10 to receive one-to-many transmissions, such as broadcast or multicast transmissions, of content 40. As previously noted, content may include text content, audio content, video content, gaming content or any other multimedia content received via one-to-many transmissions. In this regard, the content may include subscription and non-subscription content, as well as advertising content which may be transmitted in conjunction with other content. Each of the plurality of content 40 will have at least one associated content identifier 42 that allows for the content to be referred to another communication device. Examples of content identifiers include, but are not limited to, a name, a number, a symbol, a code, etc. Content 40 may be stored locally at the communication device, remotely at a network device that is accessible to the communication device or, in instances in which the transmission is streaming content, the content may be played or otherwise consumed substantially without being stored on communication device 10.

The memory 34 of communication device may include content player module 44 operable for playing or otherwise consuming content 40. The memory also includes content referral module 46 operable for providing content referrals to other communication devices. In one aspect, the content referral module 46 is implemented in conjunction with the content player module 44, such that the playing or consumption of content by the player module provides for a user option to refer content to another communication device or a user associated with another communication device. The content referral module 46 is operable to generate a referral request message 48. In generating the referral request message 48, the content referral module 46 is operable for obtaining a content identifier 42 corresponding to the content to be referred and a referral identifier 50 corresponding to the referral receiving device.

In one aspect, a user of the first communication device 10 will choose content to be referred. The chosen content may be currently being played by content player module 44, stored within memory 34 or otherwise available for playing/consumption by first communication device 10. Choosing content for referral will provide for the content referral module 46 to obtain a content identifier 42 corresponding to the chosen one of the plurality of content. In addition, a user of the first communication device 10 will choose one or more referral receiving devices. Referral receiving devices may be identifiable by the user's name that is associated with the referral receiving device or a number, such as a telephone number or an address, such as an email address corresponding to the referral receiving device. Choosing a referral receiving device will provide for the content referral module 46 to obtain a referral identifier 50 corresponding to the chosen referral-receiving device. Once the content identifier 42 and the referral identifier 50 are obtained, the content referral module 46 will generate a referral request message 48 that includes the content identifier 42, the referral identifier 50 and a referring identifier 52 that identifies first communication device 10 as the referring device and/or identifies the user of the first communication device 10. The referral request message 48 may additionally include referral information 53, such as an indicator that indicates that content is being referred, the name of the referring party, any note that the referring party may choose to append to the referral message and the like.

Once the referral request message 48 has been generated, the first communication module communicates the message 48, via the communication module 36, to the network device 14 and/or the second communication device 12. In some aspects, the referral request message 48 will be communicated to network device 14, via network communication 20, which will coordinate the communication of the referral to the designated referral-receiving device. In other aspects, the referral request message 48 may be sent directly to the second communication device 12, e.g., the referral-receiving device, via network communication 20, peer-to-peer communication network 22 or some other suitable network. In those aspects in which the referral request message 48 is sent directly to the second communication device 12, it may additionally be sent to the network device 14 for the purpose of tracking the referral and/or using referral data to optimize the delivery of the referred content.

The system may also include network device 14 that is operable for coordinating the delivery of referrals and, in some aspects, optimizing the delivery of referred content based on referral data. The features of the network device 14 that pertain to optimization of the delivery of the referred content are not shown in FIG. 1 but rather are illustrated and discussed in relation to FIG. 3. The network device 14 may include a computing platform 60 that includes a processor 62 a memory 64 and a communication module 66. The communication module 66 is operable to receive the referral request message 48 communicated from the first communication device 10, e.g., the referring communication device. The referral request message 48 will include a first content identifier 42 corresponding the predetermined referred content, one or more referral identifiers 50 corresponding to the one or more predetermined referral-receiving devices, a referring identifier 52 that corresponds to the referring device and/or the user of the referring device and, optionally, referral information 53, such as an indicator that indicates that content is being referred, the name of the referring party, any note that the referring party may choose to append to the referral message and the like.

In some aspects, the memory 64 of network device 14 may include a referral coordinator module 68 operable for coordinating the referral of content to the designated referral-receiving devices. In such aspects, the referral coordinator module 68 may be operable to receive or otherwise implement the information included in the referral request message 48. The referral coordinator module 68 may implement the information in the referral request message 48 to generate a referral message 70. The referral message 70 may include a second content identifier 72 corresponding to the predetermined referred content, a referral identifier 50 corresponding to the referral-receiving device, a referring identifier 52 corresponding to the referring device and, optionally, referral information 53. In some aspects, the first and second content identifier may be one in the same, in other aspects, the first content identifier may differ from the second content identifier. Additionally, the referral information 53 may include the delivery schedule for broadcast or multicast transmissions of the referred content or a hyperlink for transmitting the content via unicast transmission. The referral message 70 may be communicated, via communication module 66, to the one or more predetermined referral-receiving devices. The referral message may be communicated as a standalone message, or the referral message 70 may be attached to the one or more of the subsequent one-to-many transmissions of the referred content, or the referral message 70 may be communicated to the referral receiving devices by any other communication technique. The referral coordinator module 68 may be configured to communicate the referral message 70 immediately upon receipt of the referral request message 48, or the module may be configured to delay communication to an appropriate time to insure that the referral-receiving devices receive and acknowledge the referral.

In addition, the referral-coordinator module 68 may provide for the logging of referral data 74. Referral data 74 may be used by network device 14 or by other devices in the communication network for various purposes. For example, referral data 74 may provide for a rate of referral (e.g., the volume of referral for a specific piece of content over a specified period of time). Rates of referral may indicate the popularity of the given piece of content. In some aspects, the rates of referral may be used to determine billing rates associated with certain content. For example, if the content is a highly referred commercial video file, the content provider may determine that the content should be available at a premium fee, while in the instance of a lesser referred commercial video file, the content provider may determine that the content should be available at a discounted fee. In the same regard, if the content is advertising content or the content is associated with advertising content, the rate of referral may be used to alter advertising rates, e.g., higher rates of referral of content or advertising content may dictate higher associated advertising rates while lower rates of referral of content or advertising content may dictate lower associated advertising rates. In addition, referral data 74 may be used to optimize delivery of referred content. As previously noted, optimization of the delivery of content will be discussed in relation to FIG. 3.

The referral system 2 will also include a second communication device 12 that is operable to receive the referral and to communicate the referral to the user of the device 12. The second communication device 12 includes a computer platform 80 having a processor 82, a memory 84 and a communication module 86. The communication module 86 is operable to receive a referral request message 48 transmitted from the first communication device 10 and/or a referral message 70 communicated from the network device 14. The referral request message 48 includes first content identifier 42 corresponding to the referred piece of content, referral identifier 50 corresponding to the referral receiving device, such as second communication device 12, referring identifier 52 corresponding to the referring device, such as first communication device 10 and, optionally, referral information 53. The referral message 70 includes second content identifier 72 corresponding to the referred piece of content, referral identifier 50 corresponding to the referral receiving device, such as second communication device 12, referring identifier 52 corresponding to the referring device, such as first communication device 10 and, optionally, referral information 53.

In some aspects, the received content referrals 48 or 70 may identify content that is transmitted to the second communication device 12 via a one-to-many transmission such as a broadcast transmission or a multicast transmission. The referred content may have previously been transmitted or otherwise received by device 12 and pre-exist in memory 84 of device 12, such as content 40 stored in the library of content media player 90. In other aspects, the referred content may have been previously transmitted to device 12 or another network device and pre-exist in remote memory that is accessible to device 12, such as a network device/server. In other aspects in which the device does not currently store the referred content or have access to other storage devices that include the referred content, device 12 may listen for one-to-many transmissions that include the referred content and capture the referred content for subsequent consumption/playing. In other aspects, the received content referrals 48 or 70 may identify content that is transmitted to the second communication device 12 via a unicast transmission, such as providing a network link, in the form of a hyperlink or the like, that is presented to the user of device 12 for the purpose of accessing the referred content.

The memory 84 of second communication device 12 includes a referral implementer module 88 that is operable for interpreting, presenting and implementing the received referrals. The referral implementer module 88 may be configured to present referral information 53 to the device user in any known format. Referral information 53 may include any form of an indicator that indicates that content is being referred, the referring identifier information, such as the name of the referring party and any note that the referring party may have appended to the referral message. Additionally, the referral information may include the delivery schedule for broadcast or multicast transmissions of the referred content or a hyperlink for transmitting the content via unicast transmission. In one example, the referral implementer module 88 may be configured to present referral information upon receipt, in pop-up form or otherwise, regardless of whether the device has current access to the content or whether the content has yet to be transmitted to the device. In another example, the referral implementer module 88 may present the referral information in conjunction with receipt of the content; either once the device has retrieved the content from memory, such as local memory 84 or another memory accessible to device 12, or once the content has been transmitted, such as via a one-to-many transmission, and received by the second communication device 12.

Additionally, the referral implementer module 88 may be configured to automatically play/consume the referred content, either in full form or in small segment (e.g., a clip or snippet) form along with the referral information once the content has been retrieved from memory or received by the device, via a one-to-many transmission. In other aspects, the referral implementer module 88 may be configured to play/consume the referred content only at the bequest of the user of device 12.

In some aspects, referral implementer module 88 may be configured to identify the referred content and listen to one-to-many-transmissions for the referred content and capture and store the referred content as the content is being received by content receiver 38. In this regard, the referral implementer module 88 may be operable to recognize the first or second content identifiers 42 and/or 72 in the referral request message 48 and/or referral message 70 and to capture and record the referred content if a match is found between the content identifier 42 and/or 72 and identifiers associated with received content in one-to-many transmissions.

Figure 2:
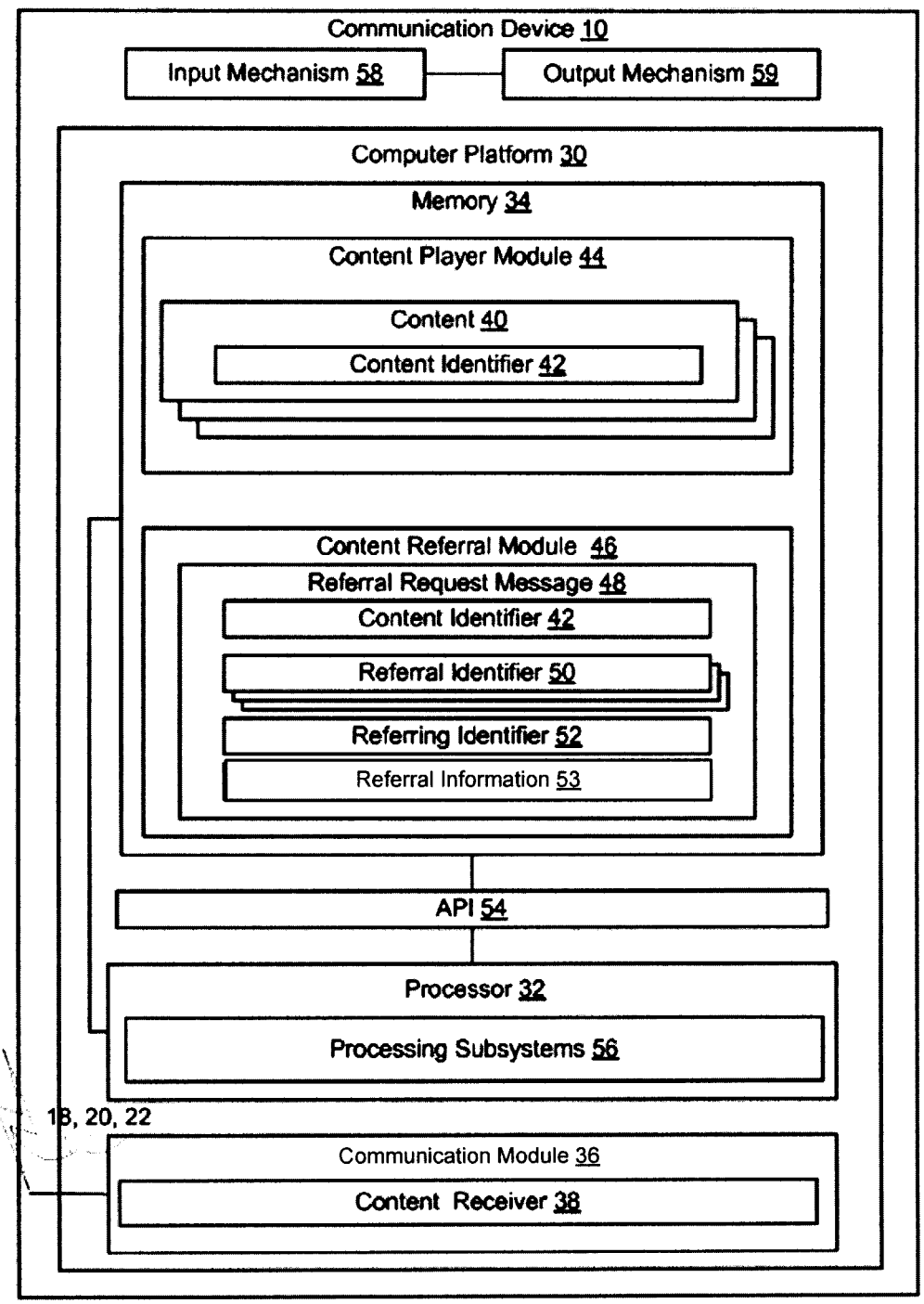
FIG. 2 is a block diagram of a communication device that refers content, in accordance with an aspect.

Referring to FIG. 2, according to one aspect, a block diagram representation of a first communication device 10, otherwise referred to as the content referring device, operable for referring content is depicted. As previously noted, the communication device may be any wired or wireless communication. Wireless communication devices may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof. Wired communication devices may include any type of computerized, communication device, such as a personal computer, a landline telephone or any other device having a wired communication portal, and which may also have a wireless connection to a network, such as a wireless cellular network, the Internet or the like. Thus, present apparatus and methods can accordingly be performed on any form of wired communication device or wired computer module.

The first communication device 10 includes computer platform 30 that can transmit data across a wireless network, and that can receive and execute routines and applications. Computer platform 30 includes memory 34, which may comprise volatile and nonvolatile memory such as read-only and/or random-access memory (RAM and ROM), EPROM, EEPROM, flash cards, or any memory common to computer platforms. Further, memory 34 may include one or more flash memory cells, or may be any secondary or tertiary storage device, such as magnetic media, optical media, tape, or soft or hard disk.

Further, computer platform 30 also includes a processor 32, which may be an application-specific integrated circuit (ASIC), or other chipset, logic circuit, or other data processing device. Processor 32 such as ASIC may execute an application programming interface (API) layer 54 that interfaces with any resident programs, such as content player module 44 and/or content referral module 46, stored in the memory 34 of the communication device 10. In wireless aspects, the API layer 54 is typically a runtime environment executing on the respective wireless device. One such runtime environment is Binary Runtime Environment for Wireless® (BREW®) software platform developed by Qualcomm, Inc., of San Diego, Calif. Other runtime environments may be utilized that, for example, operate to control the execution of applications on wireless computing devices.

Processor 32 may include various processing subsystems 56 embodied in hardware, firmware, software, and combinations thereof, that enable the functionality of communication device 10 and the operability of the communication device on a wired and/or wireless network. For example, processing subsystems 56 allow for initiating and maintaining communications, and exchanging data, with other networked devices. In aspects in which the communication device is defined as a cellular telephone the communications processor 32 may additionally include one or a combination of processing subsystems 56, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 56 of processor 32 may include any subsystem components that interact with the content player module 44 and/or content referral module 46 on computer platform 30.

Computer platform 30 may further include communication module 36 embodied in hardware, firmware, software, and combinations thereof, that enables communications among the various components of the wireless communication device 10, as well as between the communication device 10 and broadcast network 18, wireless network 20 and peer-to-peer network 22. In this regard, the communication module 36 may include a content receiver 38 operable to receive one-to-many transmissions, such as broadcast transmissions, multicast transmissions or the like. In described aspects, the communication module enables the communication of all correspondence between the first communication device 10, the second communication device 12 and network device 14. The communication module 36 may include the requisite hardware, firmware, software and/or combinations thereof for establishing a wireless or wired network communication connection.

The memory 34 of communication device 10 may include content player module 44 operable for playing or otherwise consuming content 40. Content 40 may include any content received via content receiver 38, such as one-to-many transmitted content, such as broadcast content or multicast content. In this regard, content 40 may be text content, audio content, video content, multimedia content or any other suitable presentable content. Additionally, content 40 may be commercial content, including but not limited to, song files, gaming applications, movie files, video files, book files, instructional files or the like that requires a subscription or payment for consumption/playing. Alternatively, content 40 may be non-commercial content; such as advertising content or the like that does not require subscription or payment for consumption/playing.

The memory also includes content referral module 46 operable for providing content referrals to other communication devices. In one aspect, the content referral module 46 is implemented in conjunction with the content player module 44, such that the playing or consumption of content by the player module provides for a user option to refer content to another communication device or a user associated with another communication device. In other aspects, the user of device 10 may select any other content accessible to the user for referral, such as content stored on the device, content stored remotely from the device but accessible to the device and/or content currently being received and consumed by the device but not stored (e.g., streaming content or the like). In one aspect, the content referral module 46 allows a user to choose content to be referred, referral receiving devices and any other information related to the referral, such as input of a referral message or the like.

The content referral module 46 is operable to generate a referral request message 48 based on the selection of referral content and referral-receiving devices. Upon selection of the referral content and the referral-receiving devices, the content referral module 46 obtains a content identifier 42 corresponding to the content to be referred and a referral identifier 50 corresponding to the referral receiving device. The content identifier 42 may be a name, a number, a symbol, a code or the like associated with the content that allows the network device 14 to identify the content being referred for subsequent referral to the referral receiving device 12 and/or for the referral-receiving device 12 to identify the content being referred from amongst locally stored content, remotely stored accessible content and/or one-to-many transmitted content. Alternatively, the content identifier 42 may be a hyperlink or the like that provides for the user of the referral receiving device 12 to engage in order to transmit the content via unicast transmission. The referral identifier 50 may be any name, a number, a symbol, a code or the like which identifies the referral-receiving device 12 and/or the user associated with the referral-receiving device for the purpose of properly delivering the referral to the requested referral party. The referral request message 48 may also include a referring identifier 52 that identifies the referring party and any additional referral information, such as a personalized or generic message from the referral party. The referral request message 48 may additionally include referral information 53, such as an indicator that indicates that content is being referred, the name of the referring party, any note that the referring party may choose to append to the referral message and the like.

The communication module 36 is also operable for transmitting the referral request message 48 to the network device 14 and/or the second communication device 12. In some aspects, the referral request message 48 may be communicated to a network device 14, which, in turn, generates and communicates a referral message 70 to the designated referral-receiving device. In other aspects, the referral request message 48 is sent directly to the designated referral-receiving device 12 and acts as the referral message. In aspects, in which the referral request message 48 is sent directly to the referral-receiving device 12, the referral request message may also be transmitted to the network device 14 for the purpose of tracking the referrals and optimizing network delivery of referred content.

Additionally, communication device 10 has input mechanism 58 for generating inputs into communication device, and output mechanism 59 for generating information for consumption by the user of the communication device. For example, input mechanism 58 may include a mechanism such as a key or keyboard, a mouse, a touch-screen display, a microphone, etc. In certain aspects, the input mechanisms 70 provides for user input to activate and interface with an application, such as the content player module 44 or the like on the communication device 10. In some aspects, input mechanisms provide for the user of the device to select content for referral and to select referring devices and/or other referring-users. Further, for example, output mechanism 59 may include a display, an audio speaker, a haptic feedback mechanism, etc. In the illustrated aspects, the output mechanism may include a display and an audio speaker operable to display content and referral options and audibly present content; respectively.

Figure 3:
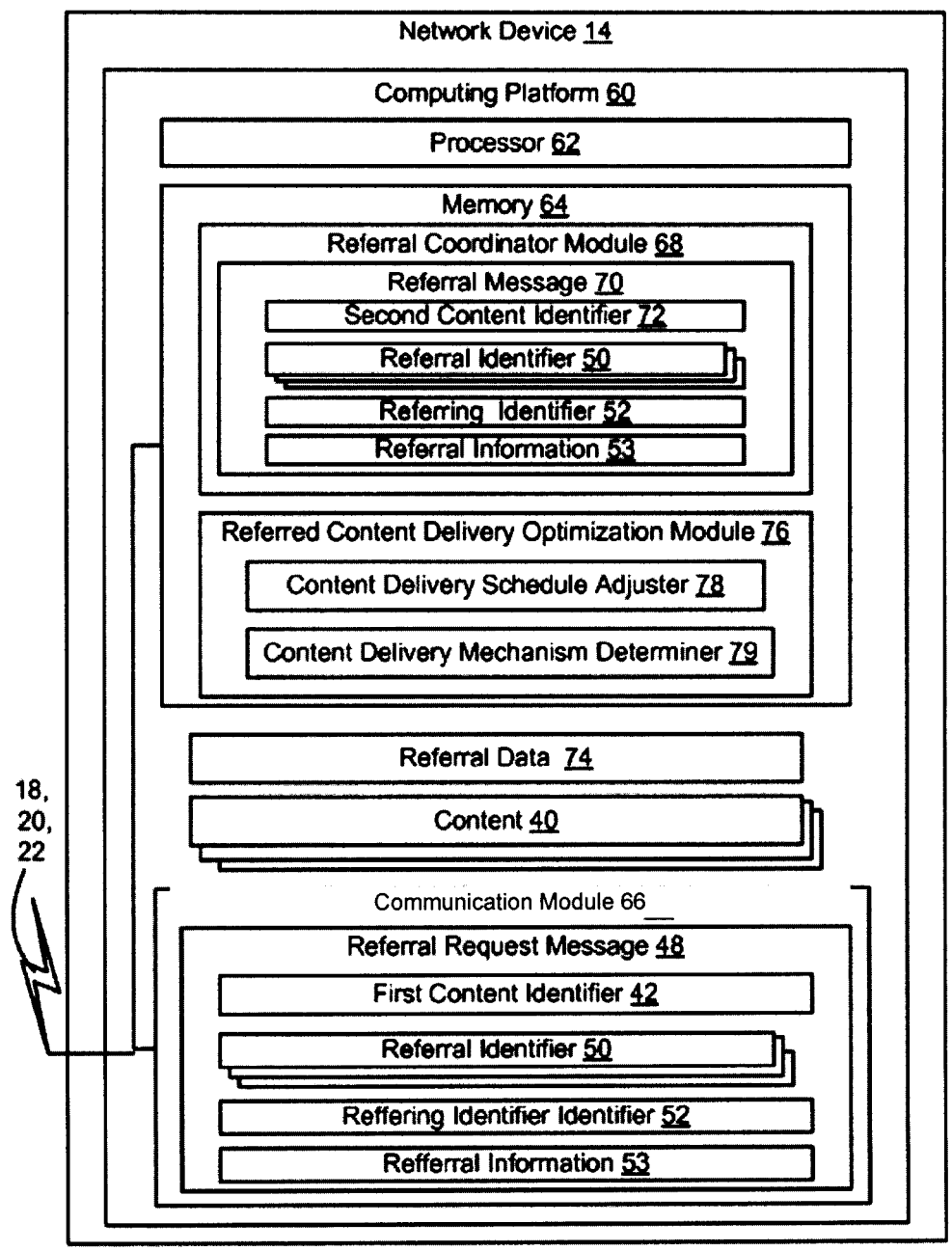
FIG. 3 is a block diagram of a network device that receives and transmits referral messages, according to another aspect.

Referring to FIG. 3, according to another aspect, a block diagram is illustrated of a network device 14, such as referral server operable to coordinate the referral of content and, in some aspects, optimize the delivery of content based on the referrals. The network device 14 may comprise at least one of any type of hardware, server, personal computer, mini computer, mainframe computer, or any computing device either special purpose or general computing device. Further, the modules and applications described herein as being operated on or executed by the network device 14 may be executed entirely on the network device 14 or alternatively, in other aspects, separate servers or computer devices may work in concert to provide data in usable formats to parties, and/or to provide a separate layer of control in the data flow between the communication device 10 and communication device 12 and the modules and applications executed by network device 14.

The network device 14 includes computer platform 60 that can transmit and receive data across network communication 20, and that can execute routines and applications. Computer platform 60 includes a memory 64, which may comprise volatile and nonvolatile memory such as read-only and/or random-access memory (RAM and ROM), EPROM, EEPROM, flash cards, or any memory common to computer platforms. Further, memory 64 may include one or more flash memory cells, or may be any secondary or tertiary storage device, such as magnetic media, optical media, tape, or soft or hard disk. Further, computer platform 60 also includes a processor 62, which may be an application-specific integrated circuit (ASIC), or other chipset, logic circuit, or other data processing device.

The computer platform 62 may further include a communication module 66 embodied in hardware, firmware, software, and combinations thereof, that enables communications among the various components of the network device 14, as well as between the network device 14 and communication devices 10 and 12. The communication module 66 may include the requisite hardware, firmware, software and/or combinations thereof for establishing a wireless communication connection. The communication module 66 is operable to receive referral request messages 48, which are transmitted from referring devices, such as first communication device 10. As previously noted, the referral request message 48 may include: first content identifier 42, corresponding to the content being referred; referral identifier 50, corresponding to the referral-receiving device; referring identifier 52, corresponding to the device referring the content, and any other referral related information; and, optionally, referral information 53, such as an indicator that indicates that content is being referred, the name of the referring party, any note that the referring party may choose to append to the referral message and the like.

The memory 64 of network device 14 may also include a referral coordinator module 68 that is operable for coordinating the delivery of content referrals to the designated referral-receiving devices. In such aspects, the referral coordinator module 68 may be operable to receive or otherwise implement the information included in the referral request message 48 to generate a referral message 70. The referral message 70 may include a second content identifier 72 corresponding to the predetermined referred content, a referral identifier 50 corresponding to the referral-receiving device, a referring identifier 52 corresponding to the referring device and, optionally, referral information 53. Additionally, the referral information 53 may include the delivery schedule for broadcast or multicast transmissions of the referred content or a hyperlink for transmitting the content via unicast transmission. In some aspects, the first and second content identifier 42 and 72 may be one in the same, for example, a title, code, number or the like that identifies the content and provides for the content to be recognized from stored content and/or one-to-many transmissions that include the content. In alternate aspects, the first content identifier may differ from the second content identifier. For example, the first content identifier may be a title, code, number or the like that identifies the content and the second content identifier may be a hyperlink that allows for the user of the referral-receiving device to activate to provide unicast transmission of the referred content.

The communication module 66 of network device 14 may further be operable to communicate the referral message 70 to the one or more predetermined referral-receiving devices. In some aspects, the referral message 70 may be communicated as a standalone message and, in other aspects, referral message 70 may be attached to one or more of the subsequent one-to-many transmissions of the referred content. In still other aspects, referral message 70 may be communicated to the referral receiving devices by any other communication technique.

In addition, the referral-coordinator module 68 may provide for the logging of referral data 74. Referral data 74 may be used by network device 14 or by other devices in the communication network for various purposes. For example, referral data 74 may provide for a rate of referral (e.g., the volume of referral for a specific piece of content over a specified period of time). Rates of referral may indicate user interest or popularity of the given piece of content. In some aspects, the rates of referral may be used to determine billing rates associated with certain content. For example, if the content is a highly referred commercial video file, the content provider may determine that the content should be available for a premium fee, while in the instance of a lesser referred commercial video file, the content provider may determine that the content should be available at a discounted fee. In the same regard, if the referred content is advertising content or the content is associated with advertising content, the rate of referral may be used to alter advertising rates, e.g., higher rates of referral of advertising content may dictate higher associated advertising rates while lower rates of referral of advertising content may dictate lower associated advertising rates.

The memory 64 of network device 14 may additional include delivery optimization module 76 that is operable for optimizing one-to-many transmissions of content 40 based on referral data. The delivery optimization module 76 may include content delivery schedule adjuster 78 that is operable to adjust delivery schedules based on the volume and/or rate of referral for a given piece of content. For example, content 40 having a high volume of referrals and/or a high rate of referral may result in adjustment of the delivery schedule to accommodate more frequent transmission/delivery of the content. In contrast, content 40 having a low volume of referrals and/or a low rate of referral may result in adjustment to the delivery schedule to accommodate less frequent transmission/delivery of the content. Additionally, delivery optimization module 76 may include content delivery mechanism determiner 79 operable to determine the delivery mechanism based on the volume and/or rate of referral. For example, content 40 having a high volume of referrals and/or a high rate of referral may be forwarded via a one-to-many transmission, such as broadcast or multicast transmission, of the referred content. In contrast, content 40 having a low volume of referrals and/or a low rate of referral may necessitate unicast transmission of the referred content to the referral-receiving device.

Figure 4:
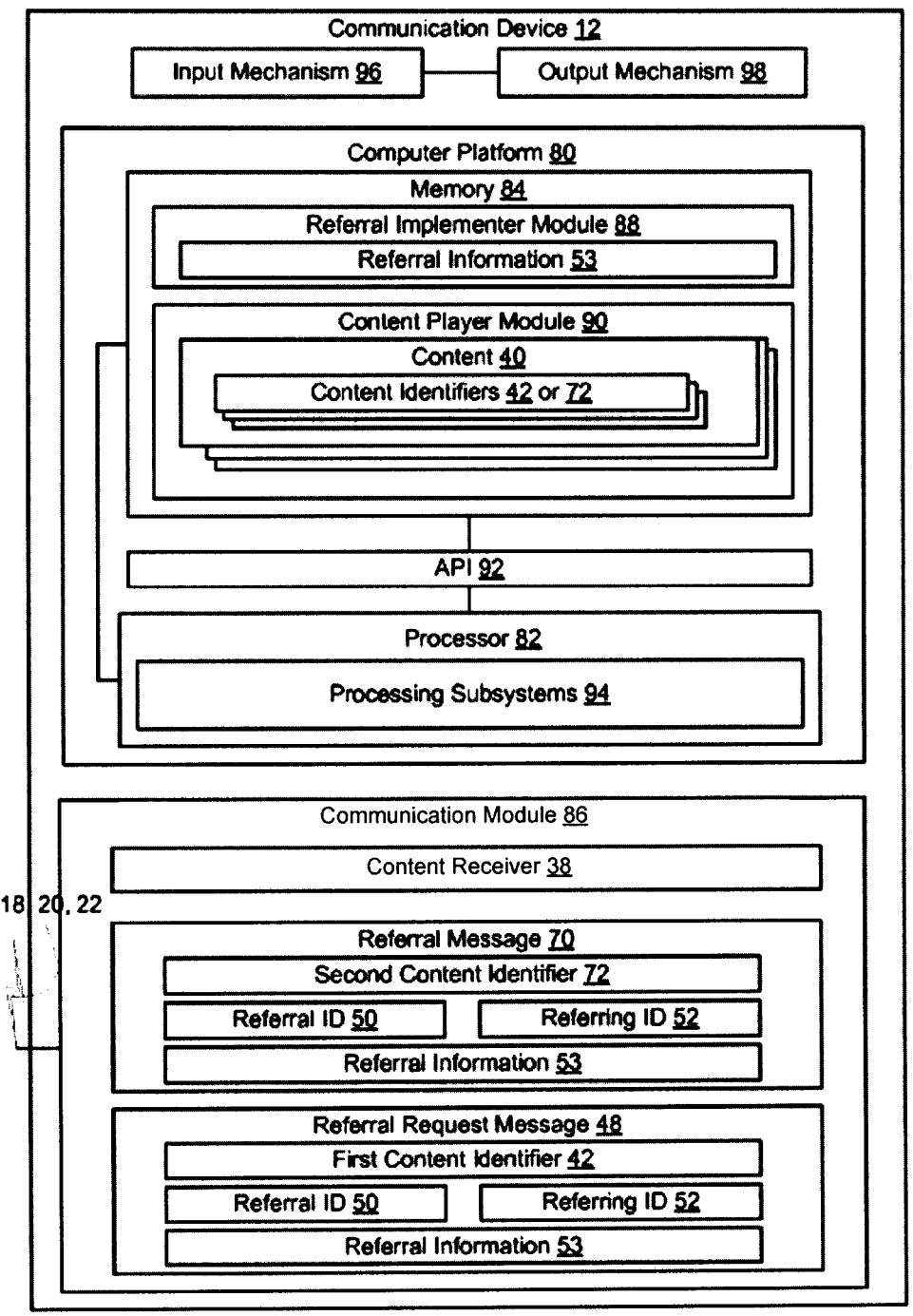
FIG. 4 is a block diagram of a communication device that receives content referrals, according to another aspect.

Referring to FIG. 4, according to one aspect, a block diagram representation of a second communication device 12, otherwise referred to as the referral-receiving device, operable for receiving a content referral and presenting the referral to the user of the device. As previously noted, the communication device 12 may be any wired or wireless communication. Wireless communication devices may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods can accordingly be performed on any form of wireless communication device or wireless computer module, including a wireless communication portal, including without limitation, wireless modems, PCMCIA cards, access terminals, desktop computers or any combination or sub-combination thereof. Wired communication devices may include any type of computerized, communication device, such as a personal computer, a landline telephone or any other device having a wired communication portal, and which may also have a wireless connection to a network, such as a wireless cellular network, the Internet or the like. Thus, present apparatus and methods can accordingly be performed on any form of wired communication device or wired computer module.

The communication device 12 includes computer platform 80 that can transmit data across a wireless network, and that can receive and execute routines and applications. Computer platform 80 includes memory 84, which may comprise volatile and nonvolatile memory such as read-only and/or random-access memory (RAM and ROM), EPROM, EEPROM, flash cards, or any memory common to computer platforms. Further, memory 84 may include one or more flash memory cells, or may be any secondary or tertiary storage device, such as magnetic media, optical media, tape, or soft or hard disk.

Further, computer platform 80 also includes a processor 82, which may be an application-specific integrated circuit (ASIC), or other chipset, logic circuit, or other data processing device. Processor 82 such as ASIC may execute an application programming interface (API) layer 92 that interfaces with any resident programs, such as content player module 90 and/or referral implementer module 88, stored in the memory 84 of the communication device 12. API 92 is typically a runtime environment executing on the respective wireless device. One such runtime environment is Binary Runtime Environment for Wireless® (BREW®) software platform developed by QUALCOMM Incorporated, of San Diego, Calif. Other runtime environments may be utilized that, for example, operate to control the execution of applications on wireless computing devices.

Processor 82 includes various processing subsystems 94 embodied in hardware, firmware, software, and combinations thereof, that enable the functionality of communication device 12 and the operability of the communication device on a wireless network. For example, processing subsystems 94 allow for initiating and maintaining communications, and exchanging data, with other networked devices. In aspects in which the communication device is defined as a cellular telephone the communications processor 82 may additionally include one or a combination of processing subsystems 94, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 94 of processor 82 may include any subsystem components that interact with the content player module 90 and/or the referral implementer module 88 on computer platform 80.

The computer platform 80 of second communication device 12 may further include a communication module 86 embodied in hardware, firmware, software, and combinations thereof, that enables communications among the various components of the second communication device 12, as well as between the device 14 and first communication devices 10 and network device 14. The communication module 86 may include the requisite hardware, firmware, software and/or combinations thereof for establishing a communication connection. The communication module 86 may include content receiver 38 operable for receiving one-to-many transmissions, such as broadcast and/or multicast transmissions. The communication module 86 is operable to receive referral request messages 48, which are transmitted from referring devices, such as first communication device 10. As previously noted, the referral request message may include first content identifier 42, corresponding to the content being referred; referral identifier 50, corresponding to the referral-receiving device; referring identifier 52, corresponding to the device referring the content and, optionally, referral information 53. The communication module 86 may also be operable to receive referral message 70, which is transmitted from network device 14. As previously noted, the referral message 70 may include second content identifier 72, corresponding to the content being referred; referral identifier 50, corresponding to the referral-receiving device; referring identifier 52, corresponding to the device referring the content; and, optionally referral information 53.

In some aspects, the received content referrals 48 or 70 may identify referred content that is transmitted to the second communication device 12 via a one-to-many transmission such as a broadcast transmission or a multicast transmission. In this regard, the referred content may have previously been transmitted or otherwise received by device 12 and pre-exist in device 12 memory 84, such as content 40 stored in the library of content media player 90. In other aspects, the referred content may have been previously transmitted to device 12 or another network device and pre-exist in remote memory that is accessible to device 12, such as a network device/server. In other aspects, in which the device does not currently store the referred content or have access to other storage devices that include the referred content, device 12 may listen for subsequent one-to-many transmissions that include the referred content and capture the referred content for subsequent consumption/playing. In other aspects, the received content referrals 48 or 70 may identify content that is transmitted to the second communication device 12 via a unicast transmission, such as providing a network link, in the form of a hyperlink or the like that is presented to the user of device 12 for the purpose of accessing the referred content.

The memory 84 of second communication device 12 includes a referral implementer module 88 that is operable for interpreting, presenting and implementing the received referrals. The referral implementer module 88 may be configured to present referral information 53 to the device user in any acceptable format or manner. Referral information 53 may include any form of an indicator that indicates that content is being referred, the referring identifier information, such as the name of the referring party and any note that the referring party may have appended to the referral message. Additionally, the referral information 53 may include the delivery schedule for broadcast or multicast transmissions of the referred content or a hyperlink for transmitting the content via unicast transmission. In one example, the referral implementer module 88 may be configured to present referral information upon receipt, in pop-up form or otherwise, regardless of whether the device has current access to the content or whether the content has yet to be transmitted to the device. In another example, the referral implementer module 88 may present the referral information in conjunction with receipt of the content; either once the device has retrieved the content from memory, either local memory 84 or another memory accessible to device 12 or once the content has been transmitted, via a one-to-many transmission, and received by the second communication device 12.

Additionally, the referral implementer module 88 may be configured to automatically play/consume the referred content, either in full form or in small segment (e.g., snippet) form along with the referral information once the content has been retrieved from memory or received by the device, via a one-to-many transmission. In other aspects, the referral implementer module 88 may be configured to play/consume the referred content only at the bequest of the user of device 12.

In some aspects, referral implementer module 88 may be configured to identify the referred content and listen to one-to-many-transmissions for the referred content and capture and store the referred content as the content is being received by content receiver 38. In this regard, the referral implementer module 88 may be operable to recognize the first or second content identifiers 40 and/or 72 in the referral request message 48 and/or referral message 70 and to capture and record the referred content if a match is found between the content identifier 42 and/or 72 and identifiers associated with received content in one-to-many transmissions.

Additionally, communication device 12 has input mechanism 96 for generating inputs into communication device, and output mechanism 98 for generating information for consumption by the user of the communication device. For example, input mechanism 96 may include a mechanism such as a key or keyboard, a mouse, a touch-screen display, a microphone, etc. In certain aspects, the input mechanisms 96 provides for user input to activate and interface with an application, such as the content player module 90 or the like on the communication device. Further, for example, output mechanism 98 may include a display, an audio speaker, a haptic feedback mechanism, etc. In the illustrated aspects, the output mechanism 98 may include a display and an audio speaker operable to display content and audibly present content; respectively, associated with the referred content.

Figure 5:
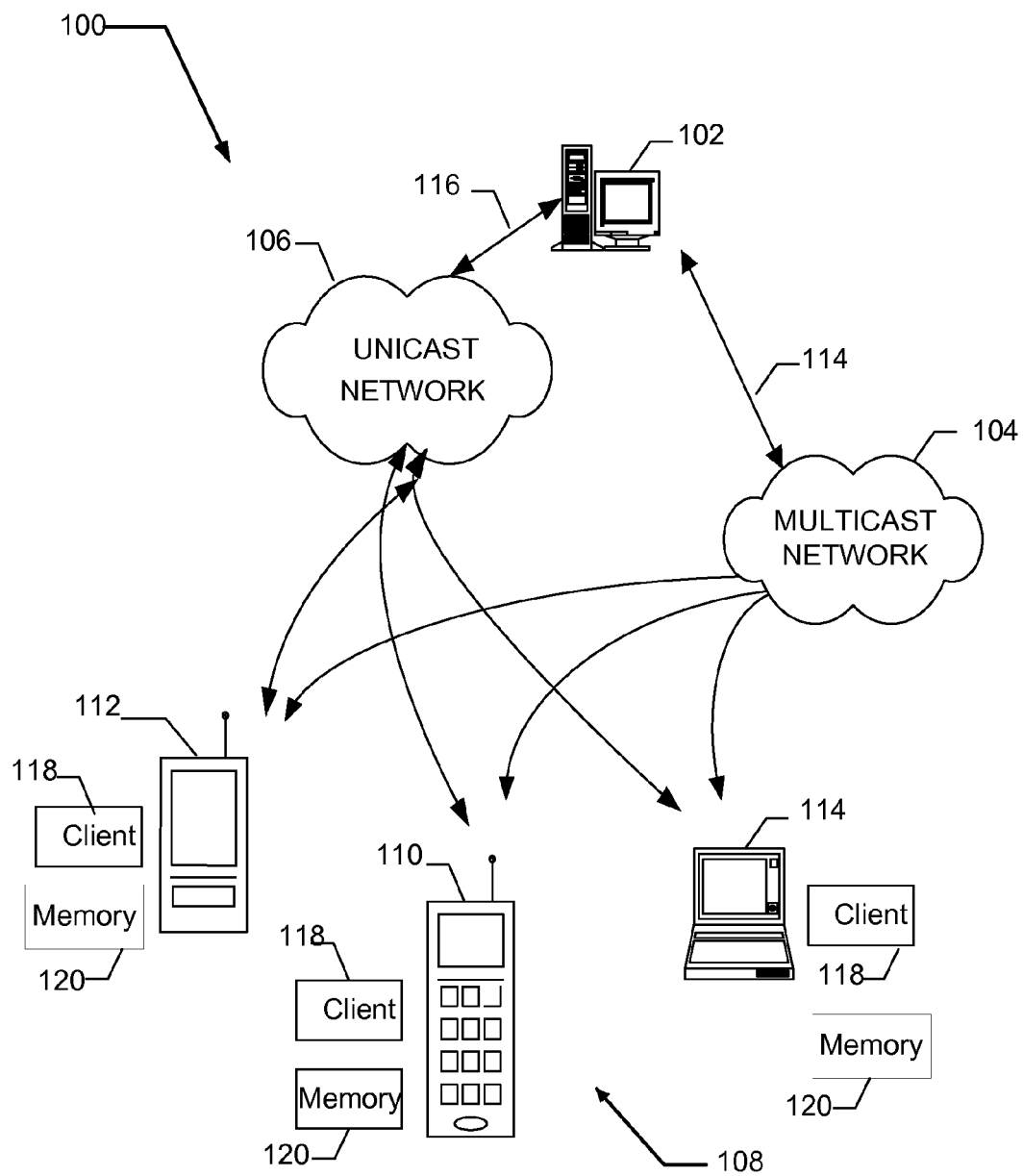
FIG. 5 is a block diagram of a broadcast communication network that includes a transport system that operates to create and transport multimedia content flows across data networks, in accordance with an aspect.

FIG. 5 illustrates a broadcast communication network 100 that includes a transport system that operates to create and transport multimedia content flows across data networks, in accordance with an aspect. For example, the transport system is suitable for use in transporting content from a server network to a wireless access network for broadcast distribution. The network 100 includes a network device, such as server 102, a multicast network 104, and a wireless access or unicast network 106. The network 100 also includes devices 108 that include a mobile telephone 110, a personal digital assistance (PDA) 112, and a notebook computer 114. The devices 108 illustrate just some of the devices that are suitable for use in one or more aspects of the transport system and may be configured to provide for broadcast media content recording and, in some aspects sharing of the recorded broadcast media content. It should be noted that although three devices are shown in FIG. 5, virtually any number of wireless devices, or types of wireless devices are suitable for use in the transport system.

The server 102 operates to provide content for distribution to users in the network 100. The content includes, but is not limited to, video, audio, multimedia content, clips, real-time and non real-time content or any other type of suitable media content. The server 102 provides the content to the multicast network 104 and/or the unicast network 106 for distribution. For example the server 102 communicates with the multicast network 104 via the communication link 114, which comprises any suitable type of wired and/or wireless communication link. Likewise, the server 102 communicates with the unicast network 106 via the communication link 116, which comprises any suitable type of wired and/or wireless communication link The network 100 includes any combination of wired and wireless networks that operate to distribute content for delivery to users. The multicast network 104 includes any combination of wired and wireless networks that are designed to broadcast high quality content. For example, the multicast network 104 may be a specialized proprietary network that has been optimized to deliver high quality content to selected devices over a plurality of optimized communication channels, such as the MediaFLO™ system.

In one or more aspects, the transport system operates to deliver content from the server 102 through the multicast network 104 or the unicast network 106, to the wireless devices 108. For example, content flow may comprise a non real-time content clip that was provided by the server 102 for distribution using the multicast network 104. In one aspect, the server 102 operates to negotiate with the multicast network 104 to determine one or more parameters associated with the content clip. Once the multicast network 104 receives the content clip, it broadcasts/multicasts the content clip over the network 100 for reception by one or more of the devices 108. Any of the devices 108 may be authorized to receive the content clip and record it and/or share it in accordance with present aspects.

For example, the devices 108 include a client program 118 that operates to provide a program guide that displays a listing of content that is scheduled for broadcast over the network 100. The device user may then select to receive any particular content for rendering in real-time or to be recorded and stored in a memory 120 for later viewing. For example the content clip may be scheduled for broadcast during the evening hours, and the devices 108 operates to receive the broadcast and record the content in the memory 120 so that the device user may view the clip in the future. Typically, the content is broadcast as part of a subscription service and the receiving device may need to provide a key or otherwise authenticate itself to receive the broadcast.

Figure 6:
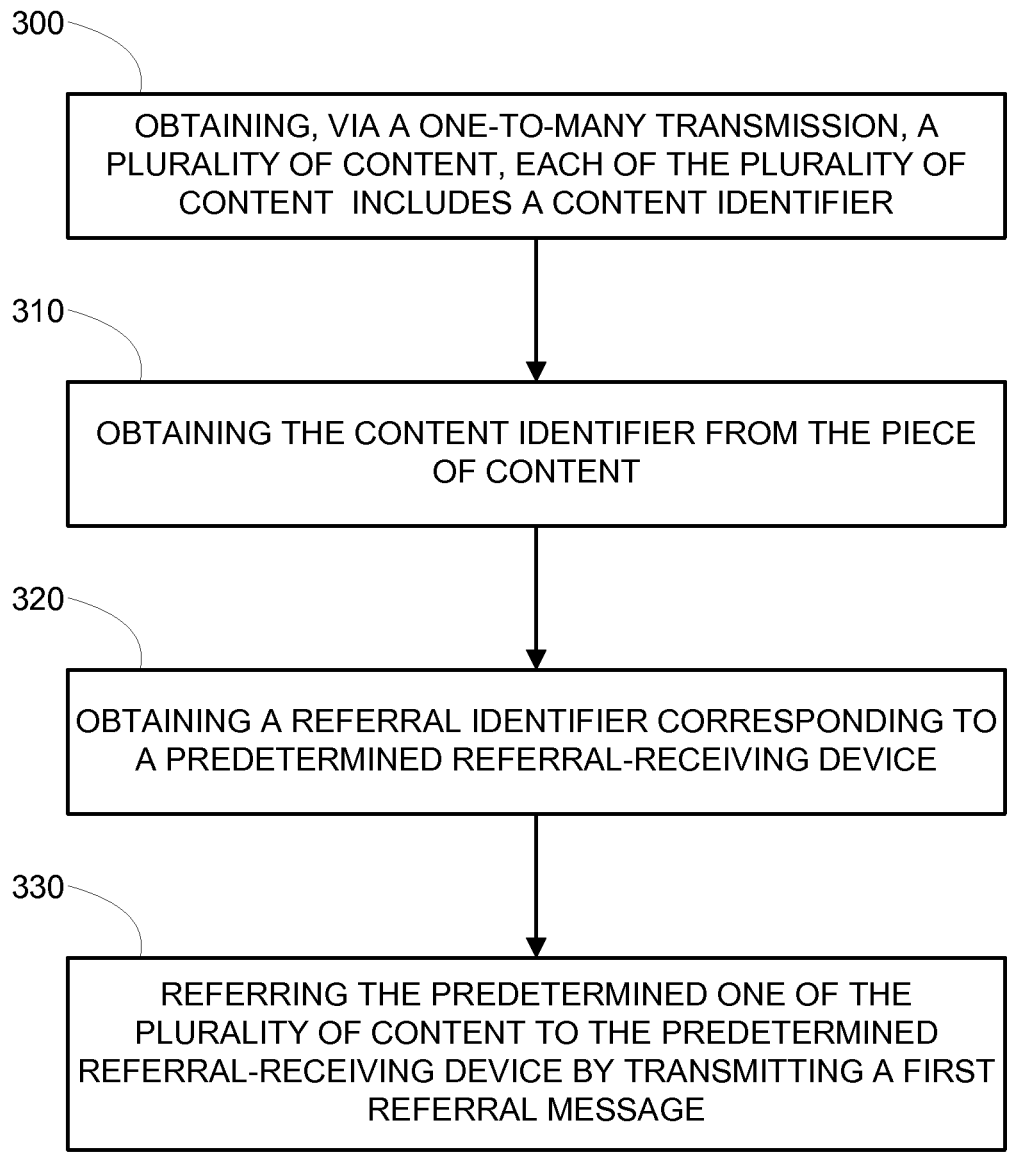
FIG. 6 is a flow diagram of a method for referring content at a communication device, in accordance with another aspect.

Referring to FIG. 6, a flow diagram of a method for referring content is depicted. At Event 300, a communication device obtains a piece of content from a one-to-many transmission, such as a broadcast transmission or a multicast transmission. The content may include, but is not limited to, text content, audio content, video content, multimedia content, gaming content and the like. In one specific aspect, the content may be advertising content. The content includes a corresponding content identifier, such as a title, a code, a number or the like that identifies the content.

At Event 310, the communication device obtains the content identifier that corresponds to the predetermined piece of content. In one aspect, a user selects a piece of content for referral and the communication device obtains the content identifier that corresponds to the selected content. At Event 320, the communication device obtains one or more referral identifiers corresponding to predetermined, one or more, referral-receiving devices. The referral identifiers may be a name, a number, an address or the like that corresponds to the referral-receiving device. In one aspect, a user selects the one or more referral-receiving devices and the communication device obtains the referral identifier that corresponds to the selected referral-receiving device.

At Event 330, the predetermined referral content is referred to the one or more predetermined referral-receiving devices by transmission of a referral request message that includes the content identifier and the one or more referral identifiers. In one aspect, the communication device transmits the referral request message to a network device that generates and transmits a referral message to the one or more predetermined referral-receiving devices. Additionally, the network device may optimize the transmission schedule of the referred content based on the referral. In another aspect, the communication device transmits the referral request message directly to the referral-receiving device and additionally may transmit the referral request message to a network device that logs referral information and, optionally, optimizes the transmission schedule of the referred content based on the referral. In aspects in which the referral request message is communicated directly to the referral-receiving device, the message may be operable, upon receipt, to activate the referral receiving-device to listen for a one-to-many transmission of the referred content and to capture the referred content if a match exists between the content identifier and the received content in the transmissions. In alternate aspects, in which the referral request message is communicated directly to the referral-receiving device, the content identifier may be defined as a hyperlink operable for providing a unicast transmission of the referred content.

Figure 7:
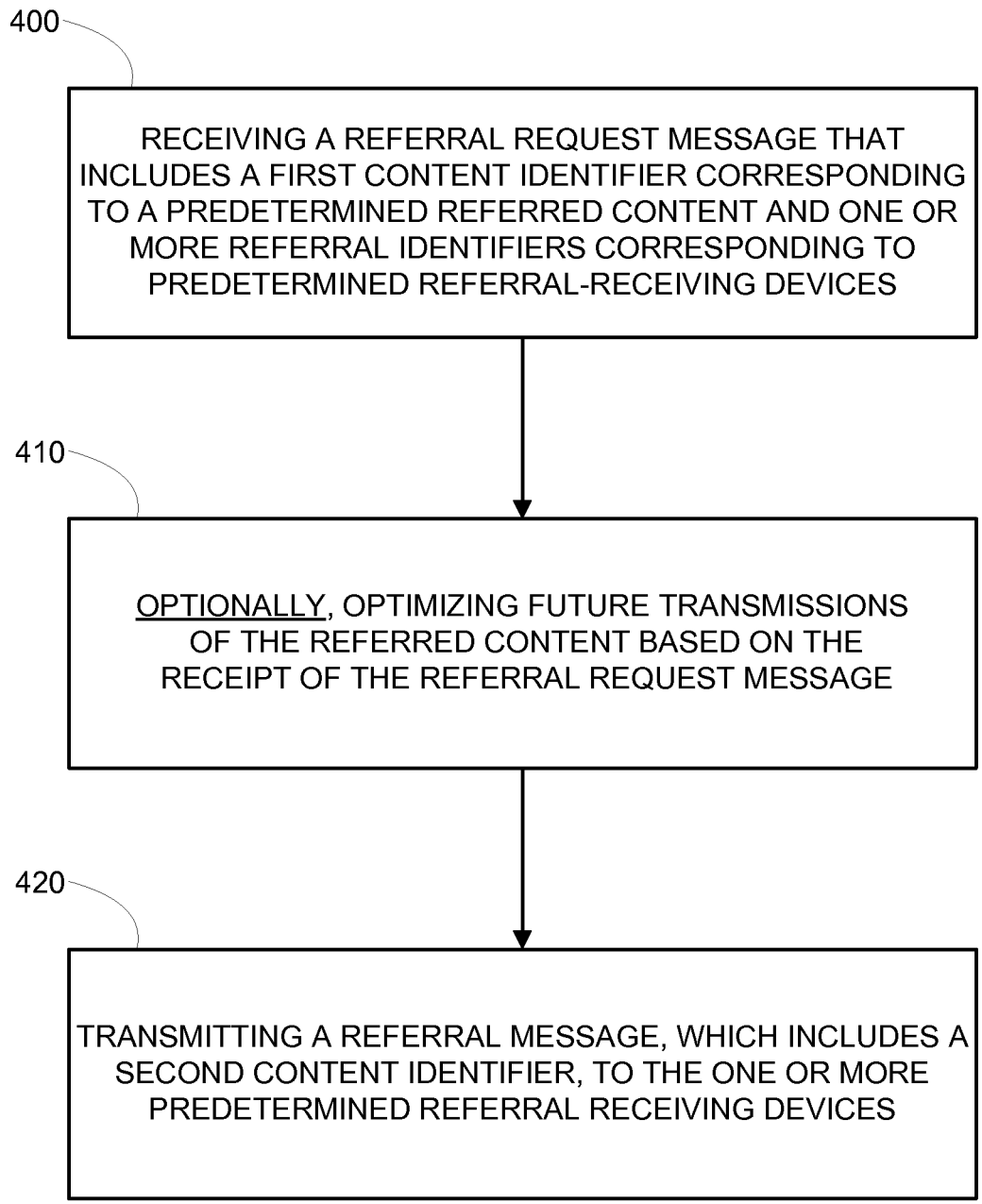
FIG. 7 is a flow diagram of a method for coordinating content referral at a network device and, optionally, optimizing, the delivery of the referred content based on the referral, in accordance with yet another aspect.

Referring to FIG. 7, a flow diagram of a method for referring content is depicted. At Event 400, a network device receives a referral request message from a communication device. The referral request message may include a content identifier corresponding to a predetermined referred piece of content and one or more referral identifiers each corresponding to a respective predetermined referral-receiving device. The predetermined piece of content may include, but is not limited to, text content, audio content, video content, multimedia content, gaming content and the like. In one specific aspect, the content may be advertising content. The content identifier may be, but is not limited to such as a title, a code, a number, a link or the like that identifies the content or provides access to the content.

At optional Event 410, the network device optimizes future transmissions of the referred content based on the referral request message. In one aspect, the network device optimizes future transmissions delivery of the referred content by determining the volume or rate of referral for any given piece of content and adjusting the transmission/delivery schedule based on the volume or rate. For example, pieces of content with higher referral volumes or higher referral rates are transmitted/delivered more frequently and pieces of content with lower volumes or lower referral rates are transmitted/delivered less frequently. Additionally, optimization may include determining the delivery mechanism for referred content based on the volume of referral or rate of referral for a given piece of content. For example, pieces of content with higher referral volumes or higher referral rates may be transmitted via one-to-many transmission, such as broadcast transmission, multicast transmission or the like and pieces of content with lower referral volumes or lower referral rates may be transmitted via a one-to-one transmission, such as unicast transmission or the like.

At Event 420, a referral message is transmitted to the one or more predetermined referral-receiving devices. The referral message includes a second content identifier corresponding to the predetermined referred content and one or more referral identifier corresponding to each of the one or more referral-receiving devices. The second content identifier may differ from the first content identifier in the referral request message or, in alternate aspects, the first and second content identifiers may be one in the same. The referral message may be transmitted as a standalone message or the referral message may be attached to subsequent one-to-many transmissions of the referred content. The referral message may be operable, upon receipt, to activate the referral receiving-device to listen for a one-to-many transmission of the referred content and to capture the referred content if a match exists between the content identifier and the received content in the transmissions. Alternatively, in other aspects, the referral message may be operable to determine if the referral-receiving device has access to memory, either local or remote, that currently stores the predetermined referred content. In alternate aspects, the second content identifier may be defined as a hyperlink operable for providing a unicast transmission of the referred content.

Figure 8:
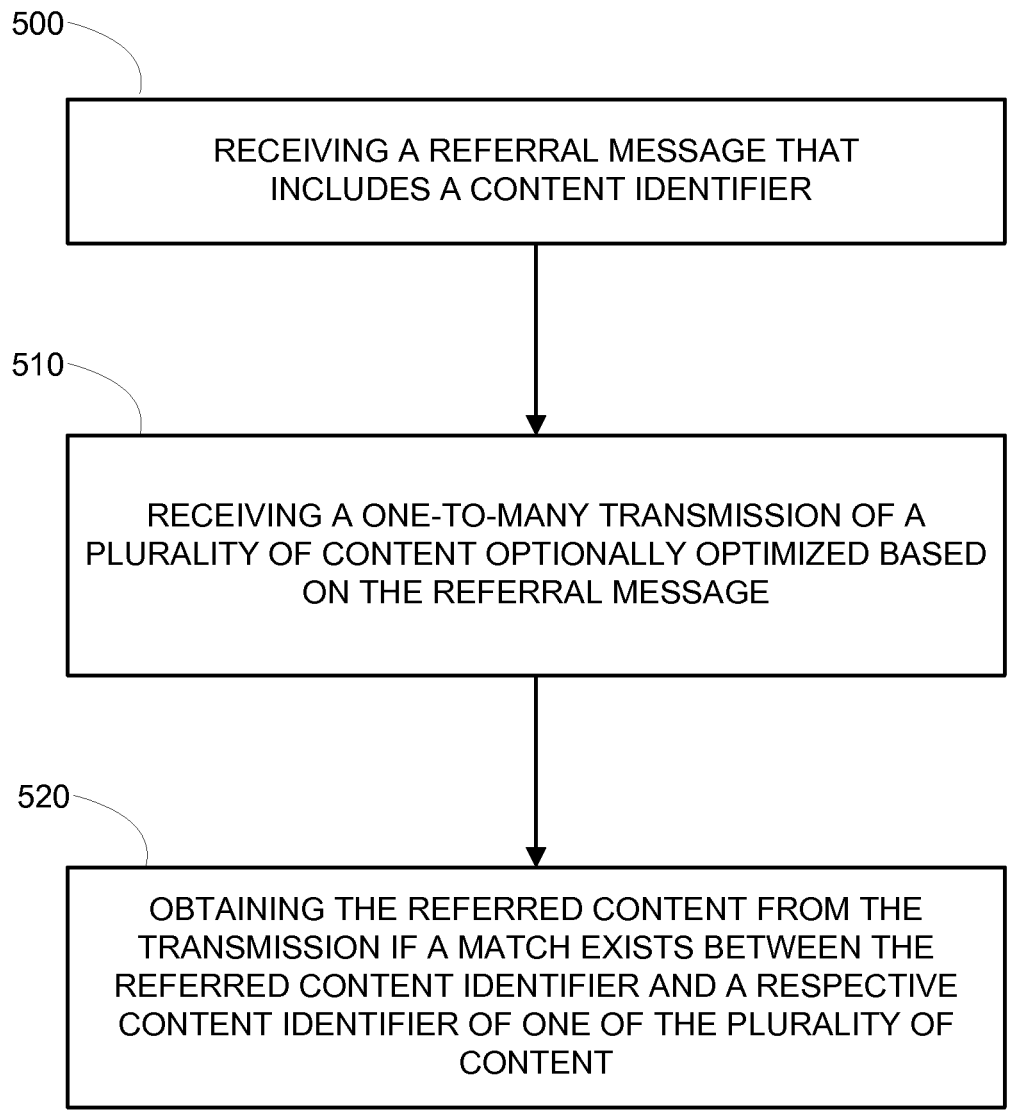
FIG. 8 is a flow diagram of a method for receiving content referrals and obtaining the referred content at a communication device, according to yet another aspect.

Referring to FIG. 8, a flow diagram of another method for referring content is depicted. At Event 500, a communication device receives a referral message that includes a content identifier. The referral message may be communicated directly from a referring communication device or, in alternate aspects; the referral message may be communicated from a network device that coordinates content referrals. The referral message may be communicated via a one-to-many transmission, via a peer-to-peer transmission or any other network transmission. The referral message may be a standalone message or the referral message may be communicated with transmission of the referred content. The predetermined piece of content may include, but is not limited to, text content, audio content, video content, multimedia content, gaming content and the like. In one specific aspect, the content may be advertising content. The content identifier may be, but is not limited to such as a title, a code, a number, a link or the like that identifies the content or provides access to the content.

At Event 510, the communication device receives one-to-many transmissions, such as broadcast transmissions, multicast transmissions or the like that include a plurality of content. The delivery/transmission of the content may be optimized based on the referral. Each of the plurality of content corresponds to a respective content identifier. At Event 520, the communication device obtains the content referred in the referral message if a match exists between the referred content identifier and a respective content identifier of one of the plurality of content. If no match exists between the referred content identifier and a respective content identifier of one of the plurality of content, the referral message may provide for obtaining the content via a one-to-one transmission, such as a unicast transmission.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

Thus, present aspects provide for referring media content at communication devices, such as wireless communication devices. The methods, systems and devices may allow for all forms of media content to be referred, such as audio, video, multimedia content and the like and, in particular advertising content. In addition, the methods, systems and device may provide for the content providers to optimize the delivery schedules and/or methods of delivery based on the volume of referrals. In addition, by tracking the volume of referrals, content providers may alter billing structure, such as advertising rates associated with advertising content.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of referring content, comprising:
obtaining, via a one-to-many transmission received by a first communication device, a plurality of content, wherein each of the plurality of content comprises a corresponding first content identifier;
obtaining, at the first communication device, the first content identifier corresponding to a predetermined one of the plurality of content desired to be referred;
obtaining, at the first communication device, a referral identifier corresponding to a predetermined referral-receiving device; and
referring the predetermined one of the plurality of content to the predetermined referral-receiving device by transmitting a first referral message comprising the first content identifier and the referral identifier to both the predetermined referral-receiving device and a network device,
wherein the network device is operable to generate and transmit to the predetermined referral-receiving device, based on and in response to receiving the referral identifier, a second referral message including a second content identifier corresponding to the predetermined one of the plurality of content and a delivery schedule exclusively for transmissions of the referred content,
wherein the second referral message is operable, upon receipt by the predetermined referral-receiving device, to activate the predetermined referral-receiving device to receive and store a broadcast transmission or a multicast transmission of the predetermined one of the plurality of content at a time specified by the delivery schedule exclusively for the transmissions of the referred content.

2. The method of claim 1, wherein obtaining, via the one-to-many transmission further comprises receiving the plurality of content via at least one of a first broadcast transmission and a first multicast transmission.

3. The method of claim 1, wherein obtaining, at the first communication device, the first content identifier further comprises receiving a user input identifying the predetermined one of the plurality of content.

4. The method of claim 1, wherein obtaining, at the first communication device, the referral identifier further comprises receiving a user input identifying the predetermined referral-receiving device.

5. The method of claim 1, wherein referring the predetermined one of the plurality of content further comprises transmitting the first referral message to the predetermined referral-receiving device based on the referral identifier.

6. The method of claim 5, wherein the first referral message is operable to activate the predetermined referral-receiving device to listen for a unicast transmission of the referred content when the predetermined referral-receiving device is unable to receive and store the broadcast transmission or the multicast transmission of the predetermined one of the plurality of content at the time specified by the delivery schedule exclusively for the transmissions of the referred content.

7. The method of claim 5, wherein the first referral message further comprises a link operable for providing a unicast transmission of the referred content.

8. The method of claim 1, wherein the predetermined content to be referred comprises advertising content.

9. A communication device, comprising a processor configured with executable instructions to perform operations comprising:
obtaining, via a one-to-many transmission, a plurality of content wherein each of the plurality of content comprises a corresponding first content identifier;
obtaining the first content identifier corresponding to a predetermined one of the plurality of content desired to be referred;
obtaining a referral identifier corresponding to a predetermined referral-receiving device; and
referring the predetermined one of the plurality of content to the predetermined referral-receiving device by transmitting a first referral message comprising the first content identifier and the referral identifier to both the predetermined referral-receiving device and a network device,
wherein the network device is operable to generate and transmit to the predetermined referral-receiving device, based on and in response to receiving the referral identifier, a second referral message including a second content identifier corresponding to the predetermined one of the plurality of content and a delivery schedule exclusively for transmissions of the referred content,
wherein the second referral message is operable, upon receipt by the predetermined referral-receiving device, to activate the predetermined referral-receiving device to listen for a broadcast transmission or multicast transmission of the predetermined one of the plurality of content at a time specified by the delivery schedule for the transmissions of the referred content.

10. A non-transitory machine-readable storage medium having stored thereon executable instructions configured to cause a processor of a communication device to perform operations comprising:
obtaining, via a one-to-many transmission a plurality of content, wherein each of the plurality of content comprises a corresponding first content identifier;
obtaining the first content identifier corresponding to a predetermined one of the plurality of content desired to be referred;
obtaining a referral identifier corresponding to a predetermined referral-receiving device; and
referring the predetermined one of the plurality of content to the predetermined referral-receiving device by transmitting a first referral message comprising the first content identifier and the referral identifier to both the predetermined referral-receiving device and a network device,
wherein the first referral message is configured to cause the network device to generate and transmit to the predetermined referral-receiving device, based on and in response to receiving the referral identifier, a second referral message including a second content identifier corresponding to the predetermined one of the plurality of content and a delivery schedule exclusively for transmissions of the referred content.

11. The non-transitory machine-readable storage medium of claim 10, wherein the stored executable instructions are configured to cause the processor to perform operations such that obtaining, via the one-to-many transmission further comprises receiving the plurality of content via at least one of a broadcast transmission and a multicast transmission.

12. The non-transitory machine-readable storage medium of claim 10, wherein the stored executable instructions are configured to cause the processor to perform operations such that obtaining, at the communication device, the first content identifier further comprises receiving a user input identifying the predetermined one of the plurality of content.

13. The non-transitory machine-readable storage medium of claim 10, wherein the stored executable instructions are configured to cause the processor to perform operations such that obtaining, at the communication device, the referral identifier further comprises receiving a user input identifying the predetermined referral-receiving device.

14. The non-transitory machine-readable storage medium of claim 10, wherein the stored executable instructions are configured to cause the processor to perform operations such that referring the predetermined one of the plurality of content further comprises transmitting the first referral message to the predetermined referral-receiving device based on the referral identifier.

15. The non-transitory machine-readable storage medium of claim 14, wherein the first referral message is operable, upon receipt by the predetermined referral-receiving device, to activate the predetermined referral-receiving device to listen for another one-to-many transmission of the referred content.

16. The non-transitory machine-readable storage medium of claim 14, wherein the first referral message further comprises a link operable for providing a unicast transmission of the referred content.

17. The non-transitory machine-readable storage medium of claim 10, wherein the predetermined content to be referred comprises advertising content.

18. A communication device, comprising:
means for obtaining, via a one-to-many transmission, a plurality of content, wherein each of the plurality of content comprises a corresponding first content identifier;
means for obtaining the first content identifier corresponding to a predetermined one of the plurality of content desired to be referred;
means for obtaining a referral identifier corresponding to a predetermined referral-receiving device; and
a means for referring the predetermined one of the plurality of content to the predetermined referral-receiving device by transmitting a first referral message comprising the first content identifier and the referral identifier to both the predetermined referral-receiving device and a network device,
wherein the first referral message is configured to cause the network device to generate and transmit to the predetermined referral-receiving device, based on and in response to receiving the referral identifier, a second referral message including a second content identifier corresponding to the predetermined one of the plurality of content and a delivery schedule exclusively for transmissions of the referred content.

19. The communication device of claim 18, wherein means for obtaining, via the one-to-many transmission further comprises means for receiving the plurality of content via at least one of a broadcast transmission and a multicast transmission.

20. The communication device of claim 18, wherein means for obtaining, at the communication device, the first content identifier further comprises means for receiving a user input identifying the predetermined one of the plurality of content.

21. The communication device of claim 18, wherein means for obtaining, at the communication device, the referral identifier further comprises means for receiving a user input identifying the predetermined referral-receiving device.

22. The communication device of claim 18, wherein means for referring the predetermined one of the plurality of content further comprises means for transmitting the first referral message to the predetermined referral-receiving device based on the referral identifier.

23. The communication device of claim 22, wherein the first referral message is operable, upon receipt by the predetermined referral-receiving device, to activate the predetermined referral-receiving device to listen for another one-to-many transmission of the referred content.

24. The communication device of claim 23, wherein the first referral message further comprises a link operable for providing a unicast transmission of the referred content.

25. The communication device of claim 18, wherein the predetermined content to be referred comprises advertising content.

26. A communication device, comprising:
a computer platform including a processor and a memory;
a content receiver in communication with the processor and operable to receive one-to-many transmissions of a plurality of content; and
a content referral module stored in the memory and executable by the processor, wherein the content referral module is operable to obtain a first content identifier corresponding to a predetermined one of the plurality of content desired to be referred, obtain a referral identifier corresponding to a predetermined referral-receiving device and generate a first referral message that includes the first content identifier and the referral identifier for transmitting to both the predetermined referral-receiving device and a network device,
wherein the first referral message is configured to cause the network device to generate and transmit to the predetermined referral-receiving device, based on and in response to receiving the referral identifier, a second referral message including a second content identifier corresponding to the predetermined one of the plurality of content and a delivery schedule exclusively for transmissions of the referred content.

27. The communication device of claim 26, wherein the content receiver is further operable to receive at least one of broadcast content and multicast content.

28. The communication device of claim 26, wherein the content referral module is further operable to receive a user input for identifying the predetermined one of the plurality of content.

29. The communication device of claim 26, wherein the content referral module is further operable to receive a user input for identifying the predetermined referral-receiving device.

30. The communication device of claim 26, wherein the content referral module is further operable to further define the first referral message as including a content listening activator operable to activate, upon receipt by the predetermined referral-receiving device, the predetermined referral-receiving device to listen for a one-to-many transmission of the referred content.

31. The communication device of claim 26, wherein the content referral module is further operable to further define the first referral message as including a link operable to provide a unicast transmission of the referred content.

32. The communication device of claim 26, wherein the predetermined one of the plurality of content comprises advertising content.

33. The communication device of claim 26, further comprising a communication module in communication with the processor and operable to transmit the first referral message to at least one of the network device and the predetermined referral-receiving device.

34. The communication device of claim 33, wherein the communication module further comprises the content receiver.

35. A method for referring content, comprising:
receiving, at a network device, a first referral message from a communication device, wherein the first referral message includes a first content identifier corresponding to a predetermined referred content and a referral identifier corresponding to a predetermined referral-receiving device, and wherein the first content identifier is also transmitted by the communication device to the predetermined referral-receiving device;
transmitting a second referral message to the predetermined referral-receiving device based on and in response to receiving the first referral message, wherein the second referral message comprises a second content identifier corresponding to the predetermined referred content and a delivery schedule exclusively for transmissions of the predetermined referred content; and
adjusting the delivery schedule for the transmissions of the predetermined referred content to increase or decrease a frequency of broadcast transmissions or multicast transmissions of the predetermined referred content exclusively based on a rate at which the predetermined referred content is being referred.

36. The method of claim 35, further comprising optimizing future transmissions of the predetermined referred content based on receipt of the first referral message.

37. The method of claim 36, wherein optimizing further comprises adjusting a transmission schedule for the predetermined referred content based on the rate at which the predetermined referred content is being referred.

38. The method of claim 36, wherein optimizing further comprises determining a content delivery mechanism for delivery of the predetermined referred content to the predetermined referral-receiving device.

39. The method of claim 38, wherein determining the content delivery mechanism further comprises determining the content delivery mechanism chosen from a group consisting of multicast transmission and unicast transmission.

40. The method of claim 35, wherein transmitting the second referral message to the predetermined referral-receiving device further comprises multicasting the second referral message to the predetermined referral-receiving device.

41. The method of claim 35, wherein transmitting the second referral message to the predetermined referral-receiving device further comprises transmitting the second referral message in conjunction with scheduled transmissions of the predetermined referred content.

42. The method of claim 35, wherein transmitting the second referral message further defines the second content identifier as a link operable for unicasting the predetermined referred content to the predetermined referral-receiving device.

43. A network device, comprising a processor configured with executable instructions to perform operations comprising:
receiving a first referral message from a communication device, wherein the first referral message includes a first content identifier corresponding to a predetermined referred content and a referral identifier corresponding to a predetermined referral-receiving device, and wherein the first content identifier is also transmitted by the communication device to the predetermined referral-receiving device;
transmitting a second referral message to the predetermined referral-receiving device based on and in response to receiving the first referral message, wherein the second referral message comprises a second content identifier corresponding to the predetermined referred content and a delivery schedule exclusively for transmissions of the predetermined referred content; and
adjusting the delivery schedule for the transmissions of the predetermined referred content to increase or decrease a frequency of broadcast transmissions or multicast transmissions of the predetermined referred content exclusively based on a rate at which the predetermined referred content is being referred.

44. A non-transitory machine-readable storage medium having stored thereon executable instructions configured to cause a processor of a network device to perform operations comprising:
receiving, at the network device, a first referral message from a communication device, wherein the first referral message includes a first content identifier corresponding to a predetermined referred content and a referral identifier corresponding to a respective predetermined referral-receiving device, and wherein the first content identifier is also transmitted by the communication device to the predetermined referral-receiving device;
transmitting a second referral message to the predetermined referral-receiving device based on and in response to receiving the first referral message, wherein the second referral message comprises a second content identifier corresponding to the predetermined referred content and a delivery schedule exclusively for transmissions of the predetermined referred content; and
adjusting the delivery schedule for the transmissions of the predetermined referred content to increase or decrease a frequency of broadcast transmissions or multicast transmissions of the predetermined referred content exclusively based on a rate at which the predetermined referred content is being referred.

45. The non-transitory machine-readable storage medium of claim 44, wherein the stored executable instructions are configured to cause the processor to perform operations further comprising:
optimizing future transmissions of the predetermined referred content based on receipt of the first referral message.

46. The non-transitory machine-readable storage medium of claim 45, wherein the stored executable instructions are configured to cause the processor to perform operations such that optimizing further comprises adjusting a transmission schedule for the predetermined referred content based on the rate at which the predetermined referred content is being referred.

47. The non-transitory machine-readable storage medium of claim 45, wherein the stored executable instructions are configured to cause the processor to perform operations such that optimizing further comprises determining a content delivery mechanism for delivery of the predetermined referred content to the predetermined referral-receiving device.

48. The non-transitory machine-readable storage medium of claim 47, wherein the stored executable instructions are configured to cause the processor to perform operations such that determining the content delivery mechanism further comprises determining the content delivery mechanism chosen from a group consisting of multicast transmission and unicast transmission.

49. The non-transitory machine-readable storage medium of claim 44, wherein the stored executable instructions are configured to cause the processor to perform operations such that transmitting the second referral message to the predetermined referral-receiving device further comprises multicasting the second referral message to the predetermined referral-receiving device.

50. The non-transitory machine-readable storage medium of claim 44, wherein the stored executable instructions are configured to cause the processor to perform operations such that transmitting the second referral message to the predetermined referral-receiving device further comprises transmitting the second referral message in conjunction with scheduled transmissions of the predetermined referred content.

51. The non-transitory machine-readable storage medium of claim 44, wherein the stored executable instructions are configured to cause the processor to perform operations such that transmitting the second referral message further defines the second content identifier as a link operable for unicasting the predetermined referred content to the predetermined referral-receiving device.

52. A network device, comprising:
means for receiving a first referral message from a communication device, wherein the first referral message includes a first content identifier corresponding to a predetermined referred content and a referral identifier corresponding to a predetermined referral-receiving device, and wherein the first content identifier is also transmitted by the communication device to the predetermined referral-receiving device;
means for transmitting a second referral message to the predetermined referral-receiving device based on and in response to receiving the first referral message, wherein the second referral message comprises a second content identifier corresponding to the predetermined referred content and a delivery schedule exclusively for transmissions of the predetermined referred content; and
means for adjusting the delivery schedule for the transmissions of the predetermined referred content to increase or decrease a frequency of broadcast transmissions or multicast transmissions of the predetermined referred content exclusively based on a rate at which the predetermined referred content is being referred.

53. The network device of claim 52, further comprising means for optimizing future transmissions of the predetermined referred content based on receipt of the first referral message.

54. The network device of claim 53, wherein means for optimizing further comprises means for adjusting a frequency of transmissions in a transmission schedule for the predetermined referred content based on the rate at which the predetermined referred content is being referred.

55. The network device of claim 53, wherein means for optimizing further comprises means for determining a content delivery mechanism for delivery of the predetermined referred content to the predetermined referral-receiving device.

56. The network device of claim 55, wherein means for determining the content delivery mechanism further comprises means for determining the content delivery mechanism chosen from a group consisting of multicast transmission and unicast transmission.

57. The network device of claim 52, wherein means for transmitting the second referral message to the predetermined referral-receiving device further comprises means for multicasting the second referral message to the predetermined referral-receiving device.

58. The network device of claim 52, wherein means for transmitting the second referral message to the predetermined referral-receiving device further comprises means for transmitting the second referral message in conjunction with scheduled transmissions of the predetermined referred content.

59. The network device of claim 52, wherein means for transmitting the second referral message further defines the second content identifier as a link operable for unicasting the predetermined referred content to the predetermined referral-receiving device.

60. A network device, comprising:
a computer platform including a processor and a memory;
a communication module in communication with the processor that is operable to receive a first referral message from a communication device, wherein the first referral message includes a first content identifier corresponding to a predetermined referred content and a referral identifier corresponding to a predetermined referral-receiving device, wherein the first content identifier is also transmitted by the communication device to the predetermined referral-receiving device;
a referral coordinator module stored in the memory and executable by the processor, wherein the referral coordinator module is operable to generate a second referral message that is transmitted, by the communication module based on and in response to receiving the first referral message, to the predetermined referral receiving device, wherein the second referral message comprises a second content identifier corresponding to the predetermined referred content and a delivery schedule exclusively for transmissions of the predetermined referred content; and
a delivery optimization module stored in the memory and executable by the processor, wherein the delivery optimization module is operable to adjust the delivery schedule for the transmissions of the predetermined referred content to increase or decrease a frequency of broadcast transmissions or multicast transmissions of the predetermined referred content exclusively based on a rate at which the predetermined referred content is being referred.

61. The network device of claim 60, further comprising a referred content optimization module operable to optimize future transmissions of the predetermined referred content based on the receipt of the first referral message.

62. The network device of claim 61, wherein the referred content optimization module is further operable to adjust a transmission schedule for the predetermined referred content based of the rate at which the predetermined referred content is being referred.

63. The network device of claim 61, wherein the referred content optimization module is further operable to determine a content delivery mechanism for delivery of the predetermined referred content to the predetermined referral-receiving device.

64. The network device of claim 63, wherein the referred content optimization module is further operable to determine the content delivery mechanism chosen from a group consisting of multicast transmission and unicast transmission.

65. The network device of claim 60, wherein the communication module is further operable to multicast the second referral message to the predetermined referral-receiving device.

66. The network device of claim 60, wherein the communication module is further operable to transmit the second referral message in conjunction with scheduled transmissions of the predetermined referred content.

67. The network device of claim 33, wherein the referral coordinator module is further operable to generate the second referral message comprising a link operable for unicasting the predetermined referred content to the predetermined referral-receiving device.

68. A method of obtaining content, comprising:
receiving a first referral message from a referring communication device comprising a first referred content identifier and a second referral message from a network device comprising a second referred content identifier and a delivery schedule exclusively for transmissions of referred content, wherein the second referral message was transmitted based on and in response to the network device receiving the first referral message from the communication device;
receiving a one-to-many transmission of a plurality of content optimized, at least in part, based on the second referral message, wherein each of the plurality of content corresponds to a respective content identifier; and
obtaining the referred content from the one-to-many transmission if a match exists between the second referred content identifier and a respective content identifier of one of the plurality of content.

69. The method of claim 68, wherein receiving the second referral message further comprises receiving another one-to-many transmission that includes the second referral message.

70. The method of claim 68, further comprising obtaining the referred content via a unicast transmission if no match exists in the one-to-many transmission.

71. The method of claim 68, wherein receiving the first referral message further defines the first referral message as including a link to a unicast transmission of the referred content.

72. The method of claim 68, wherein receiving the one-to-many transmission of the plurality of content optimized, at least in part, based on the second referral message further defines optimized as adjustments to content delivery schedules based on a volume of content referrals.

73. A communication device, comprising a processor configured with executable instructions to perform operations comprising:
receiving a first referral message from a referring communication device comprising a first referred content identifier and a second referral message from a network device comprising a second referred content identifier and a delivery schedule exclusively for transmissions of referred content, wherein the second referral message was transmitted based on and in response to the network device receiving the first referral message from the referring communication device;
receiving a one-to-many transmission of a plurality of content optimized, at least in part, based on the second referral message, wherein each of the plurality of content corresponds to a respective content identifier; and
obtaining the referred content from the one-to-many transmission if a match exists between the second referred content identifier and a respective content identifier of one of the plurality of content.

74. A non-transitory machine-readable storage medium having stored thereon executable instructions configured to cause a processor of a communication device to perform operations comprising:
receiving a first referral message from a referring communication device comprising a first referred content identifier and a second referral message from a network device comprising a second referred content identifier and a delivery schedule exclusively for transmissions of referred content, wherein the second referral message was transmitted based on and in response to the network device receiving the first referral message from the referring communication device;
receiving a one-to-many transmission of a plurality of content optimized, at least in part, based on the second referral message, wherein each of the plurality of content corresponds to a respective content identifier; and
obtaining the referred content from the one-to-many transmission if a match exists between the second referred content identifier and a respective content identifier of one of the plurality of content.

75. The non-transitory machine-readable storage medium of claim 74, wherein the stored executable instructions are configured to cause the processor to perform operations such that receiving the first referral message further comprises receiving another one-to-many transmission that includes the second referral message.

76. The non-transitory machine-readable storage medium of claim 74, wherein the stored executable instructions are configured to cause the processor to perform operations such that receiving the first referral message further comprises receiving the first referral message transmitted directly from the referring communication device.

77. The non-transitory machine-readable storage medium of claim 74, wherein the stored executable instructions are configured to cause the processor to perform operations further comprising obtaining the referred content via a unicast transmission if no match exists in the one-to-many transmission.

78. The non-transitory machine-readable storage medium of claim 74, wherein the stored executable instructions are configured to cause the processor to perform operations such that receiving the first referral message further defines the first referral message as including a link to a unicast transmission of the referred content.

79. The non-transitory machine-readable storage medium of claim 74, wherein the stored executable instructions are configured to cause the processor to perform operations such that receiving the one-to-many transmission of the plurality of content optimized, at least in part, based on the second referral message further defines optimized as adjustments to content delivery schedules based on a volume of content referrals.

80. A communication device, comprising:
means for receiving a first referral message from a referring communication device comprising a first referred content identifier and a second referral message from a network device comprising a second referred content identifier and a delivery schedule exclusively for transmissions of referred content, wherein the second referral message was transmitted based on and in response to the network device receiving the first referral message from the referring communication device;
means for receiving a one-to-many transmission of a plurality of content optimized, at least in part, based on the second referral message, wherein each of the plurality of content corresponds to a respective content identifier; and means for obtaining the referred content from the one-to-many transmission if a match exists between the second referred content identifier and a respective content identifier of one of the plurality of content.

81. The communication device of claim 80, wherein means for receiving the first referral message further comprises means for receiving another one-to-many transmission that includes the second referral message.

82. The communication device of claim 80, wherein means for receiving the first referral message further comprises means for receiving the first referral message transmitted directly from the referring communication device.

83. The communication device of claim 80, further comprising means for obtaining the referred content via a unicast transmission if no match exists in the one-to-many transmission.

84. The communication device of claim 80, wherein means for receiving the first referral message further defines the first referral message as including a link to a unicast transmission of the referred content.

85. The communication device of claim 80, wherein means for receiving a one-to-many transmission of the plurality of content optimized, at least in part, based on the second referral message further defines optimized as adjustments to content delivery schedules based on a volume of content referrals.

86. A communication device, comprising:
  a computer platform including a processor and a memory;
  a communication module in communication with the processor, wherein the
  communication module is operable to receive a first referral message from a referring communication device comprising a first referred content identifier and a second referral message from a network device comprising a second referred content identifier and a delivery schedule exclusively for transmissions of referred content, wherein the second referral message was transmitted based on and in response to the network device receiving the first referral message from the referring communication device,
  and operable to receive a one-to-many transmission of a plurality of content optimized, at least in part, based on the second referral message, wherein each of the plurality of content corresponds to a respective content identifier and the one-to-many transmission comprises at least one of a broadcast transmission or a multicast transmission; and
  a referral implementer module stored in the memory and executable by the processor, wherein the referral implementer module is operable to obtain the referred content if a match exists between the second referred content identifier and a respective content identifier of one of the plurality of content.

87. The communication device of claim 86, wherein the communication module is further operable to receive another one-to-many transmission that includes the second referral message.

88. The communication device of claim 86, wherein the referral implementer module is further operable to obtain the referred content from the memory.

89. The communication device of claim 86, wherein the referral implementer module is further operable to obtain the referred content from a unicast transmission if no match exists in the one-to-many transmission.

* * * * *